(12) United States Patent
Slawinski et al.

(10) Patent No.: US 10,030,098 B2
(45) Date of Patent: Jul. 24, 2018

(54) PROCESS FOR THE PREPARATION OF DEFINED FUNCTIONAL LACTIC ACID OLIGOMERS

(71) Applicant: TOTAL RESEARCH & TECHNOLOGY FELUY, Seneffe (BE)

(72) Inventors: Martine Slawinski, Nivelles (BE); Marion Helou, Ixelles (BE); Jeroen Wassenaar, Bruxelles (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 0 days.

(21) Appl. No.: 14/364,568

(22) PCT Filed: Dec. 14, 2012

(86) PCT No.: PCT/EP2012/075485
§ 371 (c)(1),
(2) Date: Jun. 11, 2014

(87) PCT Pub. No.: WO2013/087812
PCT Pub. Date: Jun. 20, 2013

(65) Prior Publication Data
US 2014/0323683 A1 Oct. 30, 2014

(30) Foreign Application Priority Data
Dec. 15, 2011 (EP) .................................. 11193733

(51) Int. Cl.
C08G 63/82 (2006.01)
C08G 63/08 (2006.01)
C08G 63/78 (2006.01)

(52) U.S. Cl.
CPC ........... *C08G 63/823* (2013.01); *C08G 63/08* (2013.01); *C08G 63/78* (2013.01)

(58) Field of Classification Search
CPC ...... C08G 63/08; C08G 63/78; C08G 63/823; C08G 2261/126
See application file for complete search history.

(56) References Cited

U.S. PATENT DOCUMENTS

| 5,399,666 | A | 3/1995 | Ford |
| 6,376,418 | B1 | 4/2002 | Shamshoum et al. |
| 2006/0149030 | A1 | 7/2006 | Martin-Vaca et al. |
| 2007/0185304 | A1 | 8/2007 | Ben et al. |
| 2008/0177009 | A1* | 7/2008 | Sodergard ............... C08L 67/04 525/450 |

FOREIGN PATENT DOCUMENTS

| EP | 0899274 | A1 | 3/1999 |
| EP | 1728811 | A1 | 12/2006 |
| FR | 2912752 | A1 | 8/2008 |
| JP | 2005-281424 | * | 10/2005 |
| JP | 2005281424 | A | 10/2005 |
| WO | 98/01493 | A1 | 1/1998 |
| WO | 02083761 | A1 | 10/2002 |
| WO | 2004041889 | A2 | 5/2004 |
| WO | 2011067385 | A1 | 6/2011 |

OTHER PUBLICATIONS

Rule A-3 Unsaturated Compounds, Published 1979 Blue Book IUPACK—see http://www.acdlabs.com/iupac/nomenclature/79/r79_53.htm.*
Stanford et al "One-Pot Synthesis of R,ω—Chain End Functional, Stereoregular,Star-Shaped Poly(lactide)",Macromolecules 2009, 42, 141-147.*
Hiltunen, K., et al., "Synthesis and Characterization of Lactic Acid Based Telechelic Prepolymers", Macromolecules, American Chemical Society, Dec. 30, 1996, vol. 29, No. 27, pp. 8677-8682, XP000637110.
Zhao, Y.-L., et al., "Synthesis and thermal properties of novel star-shaped poly(L-lactide)s with starburst PAMAM-OH dendrimer macroinitiator", Polymer, Jan. 1, 2002, vol. 43, No. 22, pp. 5819-5825, XP004379786.
Schnabelrauch, M., et al., "Biodegradable polymer networks based on oligolactide macromers: synthesis, properties and biomedical applications", Biomolecular Engineering, Aug. 1, 2002, vol. 19, No. 2-6, pp. 295-298, XP004378107.
Williams, C. K., et al., "A Highly Active Zinc Catalyst for the Controlled Polymerization of Lactide", Journal of the American Chemical Society, ACS Publications, Jan. 1, 2003, vol. 125, No. 37, pp. 11350-11359, XP002534371.

(Continued)

*Primary Examiner* — Ling Choi
*Assistant Examiner* — Gennadiy Mesh
(74) *Attorney, Agent, or Firm* — Albert Shung

(57) ABSTRACT

A process for the manufacture of a block copolymer includes a reaction of a lactide monomers in the presence of a catalyst with a polymer to form the block copolymer having a lactic acid chain, wherein a polymer selected from polypropylene, polyethylene, polysiloxane, polybutylene succinate, polytrimethylene carbonate, polyester, polyether, polystyrene, polyisoprene, polycarbonate, polyalkylenecarbonate, polyvinyl alcohol, polyurethane, or polyacrylate; and wherein the polymer contains n number of OH and/or NH2 group(s), n is an integer greater than or equal to 1 and $$\frac{\text{Moles of Lactide}}{(\text{Moles of Compound} * n)} \leq 70,$$

and the reaction is performed at a temperature of at least 70° C. The process includes step of quenching of the reaction in order to form the lactic acid chains consisting of 70 or less of the lactide monomers, and the quenching agent is an acid chloride having a formula of Cl—CO—$R^9$, wherein $R^9$ is 1-pentenyl or aminoethyl.

9 Claims, 2 Drawing Sheets

(56) References Cited

OTHER PUBLICATIONS

Akizuki, T., et al., Poly (alpha-hydroxy carboxylic acid)/poly olefin-type block copolymer for resin composition, comprises preset amount of poly (alpha-hydroxy carboxylic acid) component and polyolefin component, WPI/Thomson, 2005, vol. 2005,No. 78, XP002692431.

Tian, D., et al.,"Macromolecular Engineering of Polylactones and Polylactides. 18. Synthesis of Star-Branched Aliphatic Polyesters Bearing Various Functional End Groups", Macromolecules, American Chemical Society, Jul. 18, 1994, vol. 27, No. 15, pp. 4134-4144, XP000456655.

"Compatibility: Two-phase Polymer-Polymer Blends", Encyclopedia of polymer science and engineering, Nov. 11, 1985, vol. 3, pp. 771-772, XP002692432.

Bergbreiter, D., et al., "Polypropylene Surface Modification by Entrapment Functionalization", Macromolecules, 1998, vol. 31, No. 11, pp. 3417-3423.

International Search Report issued in PCT/EP2012/075485 dated Mar. 14, 2013 (6 pages).

\* cited by examiner

PROCESS FOR THE PREPARATION OF DEFINED FUNCTIONAL LACTIC ACID OLIGOMERS

CROSS-REFERENCE TO RELATED APPLICATIONS

This application claims the benefit of PCT/EP2012/075485, filed on Dec. 14, 2012, which claims priority from EP 11193733.0, filed on Dec. 15, 2011.

FIELD OF THE INVENTION

The present invention is in the field of processes for the manufacture of defined functional lactic acid oligomers, in particular, by contacting lactide with at least one compound that is a transfer agent. It also relates to oligomers prepared according to the process.

BACKGROUND OF THE INVENTION

Lactic acid oligomers are commonly utilised as intermediates in the synthesis of high molecular weight poly(lactic acid) products. There is however also a growing interest for lactic acid oligomers as such. They receive special attention in the field of medical applications for instance for the production of implantable medical devices and scaffolds. Because of their intrinsic properties and their biological-based character they can be also used in added-value domains such as
- a substitute for waxes, oils and oligomers currently used in the pharmaceutical formulation domain,
- macromers (building blocks) for the polymerisation or copolymerisation of new and existing polymers,
- new products in such sectors as binding agents, plasticisers, adhesives, lubricants, inks, nucleating agents, compatibiliser, etc. where physical and chemical properties are key parameters to the performance of the material and are achieved by tailoring the material at molecular scale. Lactic acid oligomers are usually composed of a few and limited number of lactic acid units and can be obtained by polycondensation methods: the hydroxyl and carboxylic acid groups of lactic acid react together and removal of the water formed during this condensation reaction results in the formation of longer polymeric chains of lactic acid.

The main drawback of this process is the occurrence of numerous competitive reactions resulting in significant amounts of structurally unclear components. Transesterification reactions, both inter and intramolecular, can occur during the polycondensation. Impurities such as carboxylic acids (e.g. formic acid, acetic acid, propionic acid etc. . . . ) or alcohols (e.g. methanol, ethanol, propanol etc. . . . ) in the monomer (lactic acid) can act as chain terminators. Therefore, polymers of different sizes with linear, branched or ring structures might be formed.

The polycondensation of lactic acid is a step-growth reaction that results in carboxylic acid and alcoholic end-groups (di-end-functional polymers). Without further modification of the end-groups, the use of PLA oligomers as building blocks is therefore limited. For example telechelic PLA-diol receives a growing interest for the production of copolymers (amongst other with polyethylene glycol or with diisocyanate to form polyurethanes) cannot be produced directly by polycondensation.

The present invention aims to overcome the problems of the art be providing a new technique for producing well-defined functional lactic acid oligomers from lactide.

SUMMARY OF THE INVENTION

The present invention relates to a process for the manufacture of a lactic acid oligomer comprising the steps of: contacting lactide in the presence of a catalyst with at least one compound, wherein said compound is a polymer selected from the group comprising of polypropylene, polyethylene, poly (L) lactic acid, poly (D) lactic acid, poly (D,L) lactic acid, polysiloxane, polybutylene succinate, polytrimethylene carbonate, polycaprolactone, polyester, polyether, polyolefin, polystyrene, polyisoprene, polycarbonate, polyalkylenecarbonate, polyamine, polyamide, polyvinyl alcohol, polyurethane, and polyacrylate, and containing n number of OH and/or $NH_2$ group(s), where n is an integer greater than or equal to 1, and wherein $$\frac{\text{Moles of lactide}}{(\text{Moles of Compound} * n)} \leq 70,$$

and wherein
the reaction is performed at a temperature of at least 70° C.
The process may be performed with or without solvent.
The catalyst employed by the process may have general formula $M(Y^1, Y^2, \ldots Y^p)_q$, in which M is a metal selected from the group comprising the elements of columns 3 to 12 of the periodic table of the elements, as well as the elements Al, Ga, In, Tl, Ge, Sn, Pb, Sb, Ca, Mg and Bi; whereas $Y^1$, $Y^2$, . . . $Y^p$ are each substituents selected from the group comprising alkyl with 1 to 20 carbon atoms, aryl having from 6 to 30 carbon atoms, alkoxy having from 1 to 20 carbon atoms, aryloxy having from 6 to 30 carbon atoms, and other oxide, carboxylate, and halide groups as well as elements of group 15 and/or 16 of the periodic table; p and q are integers between 1 and 6.
The catalyst may have a general formula (III):

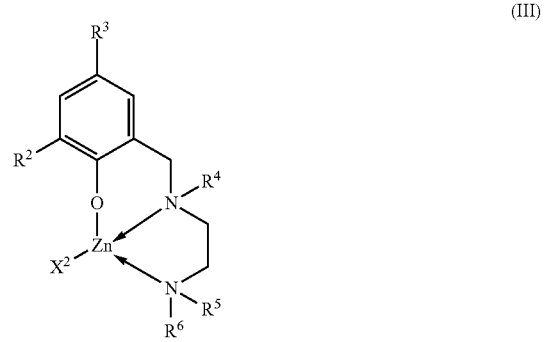

wherein
$R^2$ and $R^3$ are each independently $C_{1-10}$alkyl,
$R^4$, $R^5$ and $R^6$ are each independently $C_{1-10}$alkyl, or
$R^4$ and $R^5$ are covalently bound to each other and are each a methylene and
$R^6$ is $C_{1-10}$alkyl,
$X^2$ is selected from $C_{1-10}$alkyl, —$OR^7$, or —$N(SiR^8_3)_2$, $R^7$ is $C_{1-10}$alkyl, and $R^8$ is $C_{1-6}$alkyl.
$X^1$ may be $NH_2$. $X^1$ may be OH. n may be at least 2

$R^1$ wherein may be selected from ethyl, propyl, prop-2-yl, or octyl. $R^1$ may be propyl and n is 1, or $R^1$ may be prop-2-yl and n is 3, or $R^1$ may be ethyl and n is 2.

$R^1$ may be selected from prop-2-enecarbonyloxyethyl, prop-2-enecarbonyloxypropyl, prop-2-enecarbonyloxymethyl, ethylenecarbonyloxymethyl, ethylenecarbonyloxyethyl, or ethylenecarbonyloxypropyl.

$R^1$ may be selected from $C_6$-$C_8$aryl$C_1$-$C_4$alkyl, $C_6$-$C_8$aryl$C_1$-$C_2$alkyl or benzyl.

The number average molecular weight of the lactic acid oligomer as measured by size exclusion chromatography minus the molecular weight the compound divided by n may be equal to or below 10 100 g/mol, $$\frac{Mn(\text{lactic acid oligomer}) - Mw(\text{compound})}{n} \leq 10100 \text{ g/mol},$$

wherein Mn (lactic acid oligomer) is measured by size exclusion chromatography, and wherein n is number of OH and NH2 groups present in the compound.

The at least one compound may be a mixture of at least two of the polymers.

The invention also relates to an oligomer prepared according to the process of the invention.

DETAILED DESCRIPTION OF THE INVENTION

Figure 1:
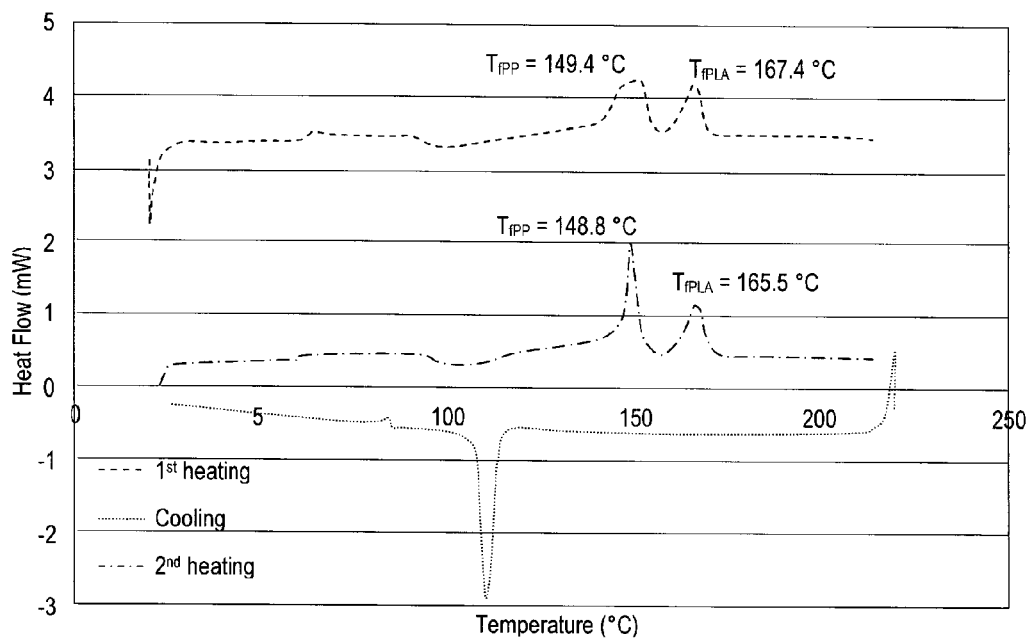
FIG. 1 is a presentation of the DSC curve for PP/PLA blend (50/50).

Unless otherwise defined, all terms used in disclosing the invention, including technical and scientific terms, have the meaning as commonly understood by one of ordinary skill in the art to which this invention belongs. By means of further guidance, term definitions are included below to better appreciate the teaching of the present invention.

Before the present process or products of the invention is described, it is to be understood that this invention is not limited to particular processes or products described, as such processes or products may, of course, vary. It is also to be understood that the terminology used herein is not intended to be limiting, since the scope of the present invention will be limited only by the appended claims.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. Where reference is made to embodiments as comprising certain elements or steps, this implies that embodiments are also envisaged which consist essentially of the recited elements or steps.

The recitation of numerical ranges by endpoints includes all numbers and fractions subsumed within the respective ranges, as well as the recited endpoints.

All documents cited in the present specification are hereby incorporated by reference in their entirety.

The present invention discloses a process for obtaining well-defined lactic acid oligomers in terms of molecular weight control, chain end control and structure control. Structure control refers to the linearity or branching, and sequence distribution in the case of copolymers.

In particular the present invention provides a process for the manufacture of a lactic acid oligomer comprising the steps of: contacting lactide in the presence of a catalyst with at least one compound, wherein said compound is a polymer selected from the group comprising of polypropylene, polyethylene, poly (L) lactic acid, poly (D) lactic acid, poly (D,L) lactic acid, polysiloxane, polybutylene succinate, polytrimethylene carbonate, polycaprolactone, polyester, polyether, polyolefin, polystyrene, polycarbonate, polyalkylenecarbonate, polyamine, polyamide, polyvinyl alcohol, polyurethane, and polyacrylate, and containing n number of OH and/or $NH_2$ group(s), where n is an integer greater than or equal to 1, and wherein $$\frac{\text{Moles of Lactide}}{(\text{Moles of Compound} * n)} \leq 70,$$

and wherein
the reaction is performed at a temperature of at least 70° C.

By the term at least one compound is meant one or more compound(s) selected from the defined list of compounds. A compound according to one aspect of the present invention is a polymer. The at least one compound can be a mixture of at least two of the polymers selected from the defined list of polymers. Therefore, if more than one compound (polymer) is used, it is meant that compounds are different compounds (different polymers), and selected from the defined list of compounds (polymers).

In an embodiment a compound used in the process according to the present invention may be a polymer selected from the group comprising polypropylene, polyethylene, poly (L) lactic acid, poly (D) lactic acid, poly (D,L) lactic acid, polysiloxane, polybutylene succinate, polytrimethylene carbonate, polyolefin, polystyrene, polycarbonate, polyalkylenecarbonate, polyvinyl alcohol, polyurethane, and polyacrylate, and containing n number of OH and/or $NH_2$ group(s), where n is an integer greater than or equal to 1.

In an embodiment a compound used in the process according to the present invention may be a polymer selected from the group comprising of polypropylene, polyethylene, poly (L) lactic acid, poly (D) lactic acid, poly (D,L) lactic acid, polysiloxane, polybutylene succinate, polytrimethylene carbonate, polystyrene, polycarbonate, polyalkylenecarbonate, polyvinyl alcohol, polyurethane, and polyacrylate, and containing n number of OH and/or $NH_2$ group(s), where n is an integer greater than or equal to 1.

In an embodiment a compound used in the process according to the present invention may be a polymer that is polypropylene containing n number of OH and/or $NH_2$ group(s), where n is an integer greater than or equal to 1. The polymer may be polypropylene containing n number of OH groups, where n is an integer greater than or equal to 1. The reaction may be performed in solvent. The reaction may be performed at a temperature of 90° C.-120° C.

In an embodiment a compound used in the process according to the present invention may be a polymer selected from the group comprising of polypropylene, polyethylene, poly (L) lactic acid, poly (D) lactic acid, poly (D,L) lactic acid, polysiloxane, polybutylene succinate, polytrimethylene carbonate, polyolefin, polystyrene, polycarbonate, polyalkylenecarbonate, polyvinyl alcohol, polyurethane, and polyacrylate, and containing n number of OH and/or $NH_2$ group(s), where n is an integer greater than or equal to 1, and the reaction is performed with solvent at a temperature of at least 90° C., preferably 90-120° C. using a catalyst of the general formula $M(Y^1, Y^2, \ldots Y^p)_q$.

In an embodiment a compound used in the process according to the present invention may be a polymer selected from the group comprising of polypropylene, polyethylene, poly (L) lactic acid, poly (D) lactic acid, poly (D,L) lactic acid, polysiloxane, polybutylene succinate, polytrimethylene carbonate, polyolefin, polystyrene, polycarbonate, polyalkylenecarbonate, polyvinyl alcohol, polyurethane, and polyacrylate, and containing n number of OH and/or $NH_2$ group(s), where n is an integer greater than or equal to 1, and the reaction is performed without solvent at a temperature of at least 110° C., preferably 140° C.-190° C. using a catalyst of the general formula $M(Y^1, Y^2, \ldots Y^p)_q$.

In an embodiment a compound used in the process according to the present invention may be a polymer selected from the group comprising of polypropylene, polyethylene, poly (L) lactic acid, poly (D) lactic acid, poly (D,L) lactic acid, polysiloxane, polybutylene succinate, polytrimethylene carbonate, polyolefin, polystyrene, polycarbonate, polyalkylenecarbonate, polyvinyl alcohol, polyurethane, and polyacrylate, and containing n number of OH and/or $NH_2$ group(s), where n is an integer greater than or equal to 1, and the reaction is performed with solvent at a temperature of at least 70° C., preferably 90-120° C. using a catalyst of the general formula (III).

In an embodiment a compound used in the process according to the present invention may be a polymer selected from the group comprising of polypropylene, polyethylene, poly (L) lactic acid, poly (D) lactic acid, poly (D,L) lactic acid, polysiloxane, polybutylene succinate, polytrimethylene carbonate, polyolefin, polystyrene, polycarbonate, polyalkylenecarbonate, polyvinyl alcohol, polyurethane, and polyacrylate, and containing n number of OH and/or $NH_2$ group(s), where n is an integer greater than or equal to 1, and the reaction is performed without solvent at a temperature of at least 110° C., preferably at least 140° C., preferably 140° C.-190° C. using a catalyst of the general formula (III).

In an embodiment a compound used in the process according to the present invention may be a polymer selected from the group comprising polypropylene, polyethylene, poly (L) lactic acid, poly (D) lactic acid, poly (D,L) lactic acid, polysiloxane, polybutylene succinate, polytrimethylene carbonate, polyolefin, polystyrene, polycarbonate, polyalkylenecarbonate, polyamine, polyamide, polyvinyl alcohol, polyurethane, polyacrylate and polyaminoacid, and containing n number of OH group(s), where n is an integer greater than or equal to 1, and the reaction is performed with or without solvent at a temperature of at least 140° C. and using a organometallic catalyst or a catalyst of the general formula $M(Y^1, Y^2, \ldots Y^p)_q$.

In an embodiment a compound used in the process according to the present invention may be a polymer selected from the group comprising polypropylene, polyethylene, poly (L) lactic acid, poly (D) lactic acid, poly (D,L) lactic acid, polysiloxane, polybutylene succinate, polytrimethylene carbonate, polycaprolactone, polyester, polyether, polyolefin, polystyrene, polyisoprene, polycarbonate, polyalkylenecarbonate, polyamine, polyamide, polyvinyl alcohol, polyurethane, polyacrylate and polyaminoacid, and containing n number of $NH_2$ group(s), where n is an integer greater than or equal to 1, and the reaction is performed with or without solvent at a temperature of at least 140° C. and using a organometallic catalyst or a catalyst of the general formula $M(Y^1, Y^2, \ldots Y^p)_q$.

In an embodiment a compound used in the process according to the present invention may be a polymer selected from the group comprising polypropylene, polyethylene, poly (L) lactic acid, poly (D) lactic acid, poly (D,L) lactic acid, polysiloxane, polybutylene succinate, polytrimethylene carbonate, polycaprolactone, polyester, polyether, polyolefin, polystyrene, polyisoprene, polycarbonate, polyalkylenecarbonate, polyamine, polyamide, polyvinyl alcohol, polyurethane, polyacrylate and polyaminoacid, and containing n number of $NH_2$ and OH group(s), where n is an integer greater than or equal to 2 and the reaction is performed with or without solvent at a temperature of at least 140° C. and using a organometallic catalyst or a catalyst of the general formula $M(Y^1, Y^2, \ldots Y^p)_q$.

In an embodiment a compound used in the process according to the present invention may be a polymer selected from the group comprising polypropylene, polyethylene, poly (L) lactic acid, poly (D) lactic acid, poly (D,L) lactic acid, polysiloxane, polybutylene succinate, polytrimethylene carbonate, polyolefin, polystyrene, polycarbonate, polyalkylenecarbonate, polyamine, polyamide, polyvinyl alcohol, polyurethane, polyacrylate and polyaminoacid, and containing n number of OH group(s), where n is an integer greater than or equal to 1, and the reaction is performed with or without solvent at a temperature of at least 110° C. and using a organometallic catalyst or using a catalyst the general formula (III).

In an embodiment a compound used in the process according to the present invention may be a polymer selected from the group comprising polypropylene, polyethylene, poly (L) lactic acid, poly (D) lactic acid, poly (D,L) lactic acid, polysiloxane, polybutylene succinate, polytrimethylene carbonate, polycaprolactone, polyester, polyether, polyolefin, polystyrene, polyisoprene, polycarbonate, polyalkylenecarbonate, polyamine, polyamide, polyvinyl alcohol, polyurethane, polyacrylate and polyaminoacid, and containing n number of $NH_2$ group(s), where n is an integer greater than or equal to 1, and the reaction is performed with or without solvent at a temperature of at least 110° C. and using a organometallic catalyst or using a catalyst the general formula (III).

In an embodiment a compound used in the process according to the present invention may be a polymer selected from the group comprising polypropylene, polyethylene, poly (L) lactic acid, poly (D) lactic acid, poly (D,L) lactic acid, polysiloxane, polybutylene succinate, polytrimethylene carbonate, polycaprolactone, polyester, polyether, polyolefin, polystyrene, polyisoprene, polycarbonate, polyalkylenecarbonate, polyamine, polyamide, polyvinyl alcohol, polyurethane, polyacrylate and polyaminoacid, and containing n number of $NH_2$ and OH group(s), where n is an integer greater than or equal to 2 and the reaction is performed with or without solvent at a temperature of at least 110° C. and using a organometallic catalyst or using a catalyst the general formula (III).

In particular, the present invention provides a process for the manufacture of a lactic acid oligomer comprising the step of contacting lactide with at least one compound that is a transfer agent, in the presence of a catalyst wherein the mole ratio of lactide to (compound.n) is equal to or below 70, wherein compound.n refers to the moles of compound multiplied by the total number (n) of OH and/or $NH_2$ groups in the compound, wherein the reaction is performed at a temperature of 110° C. to 190° C. without solvent, wherein the compound is a polymer selected from the group comprising polyolefin, polyester, polycarbonate, polypropylene, polyethylene, poly (L) lactic acid, poly (D) lactic acid, poly (D,L) lactic acid, polybutylene succinate, polytrimethylene carbonate, polyalkylenecarbonate, polysiloxane, polyether, polystyrene, polyisoprene, polyamine, polyamide, polyvinyl alcohol, polyurethane, polyacrylate and polyaminoacid, and containing n number of OH and/or $NH_2$ group(s), where n is an integer greater than or equal to 1. The product may be referred to as a co-polymer of the lactide monomer and the polymer.

The present invention also provides a process for the manufacture of a lactic acid oligomer comprising the step of contacting lactide with at least one compound that is a transfer agent, in the presence of a catalyst wherein the mole ratio of lactide to compound.n is equal to or below 70, wherein compound.n refers to the number of moles of compound multiplied by the total number of OH and/or $NH_2$ groups in the compound, and wherein the reaction is performed at a temperature of at least 70° C., preferably at least 90° C., preferably at least 105° C., wherein the compound has formula (I)

$$R^1\text{-}(X^1)_n, \qquad (I)$$

wherein $X^1$ is OH or $NH_2$, n is an integer selected from 1, 2, 4, 5, 6, 7, 8, 9, or 10 or is 1 to 10, and $R^1$ is a group selected from $C_1$-$C_{20}$alkyl; $C_{3-8}$cycloalkyl; $C_2$-$C_{20}$alkenyl; $C_2$-$C_{20}$alkynyl; $C_2$-$C_{10}$alkenylcarbonyloxy$C_1$-$C_{10}$alkyl; heterocycyl$C_1$-$C_6$alkyl; hydroxylcarbonyl$C_1$-$C_{100}$alkyl; $C_6$-$C_{10}$aryl$C_1$-$C_6$alkyloxycarbonylamino$C_1$-$C_{10}$alkyl; amino$C_1$-$C_{10}$alkyl; halo$C_1$-$C_{10}$alkylcarbonyloxy$C_1$-$C_{10}$alkyl; hydroxy$C_1$-$C_{10}$alkyl; heterocycyl; $C_6$-$C_{10}$aryl$C_1$-$C_6$alkyl; each group being optionally substituted by one or more substituents selected from $C_1$-$C_6$alkyl, hydroxyl, oxo, or wherein said at least one carbon atom in the heterocyclyl is optionally substituted by one or more oxo group, or wherein at least one nitrogen atom in the heterocyclyl is optionally substituted by an oxyl free radical.

The term "alkyl" by itself or as part of another substituent, refers to a straight or branched saturated hydrocarbon group joined by single carbon-carbon bonds having 1 to 100 carbon atoms, for example 1 to 20 carbon atoms, for example 1 to 6 carbon atoms, preferably 1 to 3 carbon atoms. When a subscript is used herein following a carbon atom, the subscript refers to the number of carbon atoms that the named group may contain.

Thus, for example, $C_{1-100}$alkyl, means an alkyl group of 1 to 100 carbon atoms, for example 1 to 75 carbon atoms, for example 1 to 50 carbon atoms, for example 1 to 25 carbon atoms, for example 1 to 20 carbon atoms, for example 1 to 10 carbon atoms, more preferably 3, 4, 5, 6, 7, 8, 9, 10, 11, 12, 13, 14, 15, 16, 17, 18, 19, 20 carbon atoms.

Thus, for example, $C_{1-25}$alkyl, means an alkyl group of 1 to 25 carbon atoms, preferably from 3 to 15 carbon atoms, more preferably 3, 4, 5, 6, 7, 8, 9, 10, 11, 12, 13, 14, 15, 16, 17, 18, 19, 20, 21, 22, 23, 24, 25 carbon atoms.

Thus, for example, $C_{1-20}$alkyl, means an alkyl group of 1 to 20 carbon atoms, preferably from 3 to 15 carbon atoms, more preferably 3, 4, 5, 6, 7, 8, 9, 10, 11, 12, 13, 14, 15, 16, 17, 18, 19, 20 carbon atoms.

Thus, for example, $C_{1-15}$alkyl, means an alkyl group of 1 to 15 carbon atoms, preferably from 3 to 15 carbon atoms, more preferably 3, 4, 5, 6, 7, 8, 9, 10, 11, 12, 13, 14, 15 carbon atoms.

Thus, for example, $C_{1-10}$alkyl, means an alkyl group of 1 to 10 carbon atoms, preferably from 3 to 10 carbon atoms, more preferably 3, 4, 5, 6, 7, 8, 9, 10 carbon atoms.

Thus, for example, $C_{1-8}$alkyl, means an alkyl group of 1 to 8 carbon atoms, preferably from 3 to 8 carbon atoms, more preferably 3, 4, 5, 6, 7, 8 carbon atoms.

Thus, for example, $C_{1-6}$alkyl means an alkyl of 1 to 6 carbon atoms, preferably from 2 to 6 carbon atoms, more preferably 2, 3, 4, 5, 6 carbon atoms.

Thus, for example, $C_{1-4}$alkyl means an alkyl of 1 to 4 carbon atoms, preferably from 2 to 4 carbon atoms, more preferably 2, 3 or 4 carbon atoms.

Alkyl groups may be linear, or branched and may be substituted as indicated herein.

Alkyl includes all linear, or branched alkyl groups. Alkyl includes, for example, methyl, ethyl, n-propyl, i-propyl, 2-methyl-ethyl, butyl and its isomers (e.g. n-butyl, i-butyl and t-butyl); pentyl and its isomers, hexyl and its isomers, heptyl and its isomers, octyl and its isomers, nonyl and its isomers, decyl and its isomers and the like.

The term "$C_{3-8}$cycloalkyl", by itself or as part of another substituent, refers to a saturated or partially saturated cyclic alkyl containing from about 3 to about 8 carbon atoms. Examples of monocyclic $C_{3-8}$cycloalkyl include cyclopropyl, cyclobutyl, cyclopentyl, or cyclohexyl.

Whenever the term "substituted" is used in the present invention, it is meant to indicate that one or more hydrogens on the atom indicated in the expression using "substituted" is replaced with a selection from the indicated group, provided that the indicated atom's normal valency is not exceeded, and that the substitution results in a chemically stable substance, i.e. a substance that is sufficiently robust to survive isolation to a useful degree of purity from a reaction mixture.

The term "alkenyl" by itself or as part of another substituent, refers to an unsaturated hydrocarbyl group, which may be linear, or branched, comprising one or more carbon-carbon double bonds having 2 to 20 carbon atoms, for example 2 to 18 carbon atoms, for example 2 to 16 carbon atoms, for example 2 to 15 carbon atoms, for example 2 to 14 carbon atoms, for example 2 to 12 carbon atoms, for example 2 to 10 carbon atoms, for example 2 to 8 carbon atoms, for example 2 to 6 carbon atoms, for example 2 to 4 carbon atoms. When a subscript is used herein following a carbon atom, the subscript refers to the number of carbon atoms that the named group may contain.

Thus, for example, $C_{2\text{-}20}$alkenyl means an alkenyl group of 2 to 20 carbon atoms, preferably 2 and 14 carbon atoms. Thus, for example, $C_{2\text{-}18}$alkenyl means an alkenyl group of 2 to 18 carbon atoms, preferably 2 to 12 carbon atoms. Thus, for example, $C_{2\text{-}16}$alkenyl means an alkenyl group of 2 to 16 carbon atoms, preferably 2 to 10 carbon atoms. Thus, for example, $C_{2\text{-}15}$alkenyl means an alkenyl group of 2 to 15 carbon atoms, preferably 2 to 10 carbon atoms. Thus, for example, $C_{2\text{-}14}$alkenyl means an alkenyl group of 2 to 14 carbon atoms, preferably 2 to 10 carbon atoms. Thus, for example, $C_{2\text{-}12}$alkenyl means an alkenyl group of 2 to 12 carbon atoms, preferably 2 to 8 carbon atoms. Thus, for example, $C_{2\text{-}10}$alkenyl means an alkenyl group of 2 to 10 carbon atoms, preferably 2 to 6 carbon atoms. Thus, for example, $C_{2\text{-}8}$alkenyl means an alkenyl group of 2 to 8 carbon atoms, preferably 2 to 6 carbon atoms. Thus, for example, $C_{2\text{-}6}$alkenyl means an alkenyl group of 2 to 6 carbon atoms, preferably 2 to 5 carbon atoms. Thus, for example, $C_{2\text{-}4}$alkenyl means an alkenyl group of 2 to 4 carbon atoms, preferably 2 or 3 carbon atoms. Non-limiting examples of alkenyl groups include ethenyl, 2-propenyl, 2-butenyl, 3-butenyl, 2-pentenyl and its chain isomers, 2-hexenyl and its chain isomers, 2,4-pentadienyl and the like.

The term "$C_{2\text{-}20}$alkynyl" by itself or as part of another substituent, refers to an unsaturated hydrocarbyl group, which may be linear, or branched, comprising one or more carbon-carbon triple bonds. When a subscript is used herein following a carbon atom, the subscript refers to the number of carbon atoms that the named group may contain.

Preferred alkynyl groups thus comprise 2 to 20 carbon atoms, for example, 2 to 14 carbon atoms, for example 2 to 8. Non limiting examples of alkynyl groups include ethynyl, 2-propynyl, 2-butynyl, 3-butynyl, 2-pentynyl and its chain isomers, 2-hexynyl and its chain isomers and the like.

The term "aryl", as a group or part of another substituent, refers to a polyunsaturated, aromatic hydrocarbyl group having a single ring (i.e. phenyl) or multiple aromatic rings fused together (e.g. naphthalene), or linked covalently, typically containing 6 to 30 atoms; wherein at least one ring is aromatic. When a subscript is used herein following a carbon atom, the subscript refers to the number of carbon atoms that the named group may contain. Thus, for example, $C_{6\text{-}30}$aryl means an aryl group of 6 to 30 carbon atoms, preferably 6 to 20 carbon atoms. Thus, for example, $C_{6\text{-}12}$aryl means an aryl group of 6 to 12 carbon atoms, preferably 6 to 10 carbon atoms. Thus, for example, $C_{6\text{-}10}$aryl means an aryl group of 6 to 10 carbon atoms, preferably 6 to 8 carbon atoms. Thus, for example, $C_{6\text{-}8}$aryl means an aryl group of 6 to 8 carbon atoms. Thus, for example, $C_{6\text{-}7}$aryl means an aryl group of 6 to 7 carbon atoms. Non-limiting examples of an aryl comprise phenyl, biphenylyl, biphenylenyl, or 1- or 2-naphthanelyl.

The term "$C_{6\text{-}10}$aryl$C_{1\text{-}6}$alkyl", as a group or as part of another substituent, means a $C_{1\text{-}6}$alkyl as defined herein, wherein a hydrogen atom is replaced by a $C_{6\text{-}10}$aryl as defined herein. Examples of aralkyl include benzyl, phenethyl, dibenzylmethyl, methylphenylmethyl, 3-(2-naphthyl)-butyl, and the like.

The term "hydroxy$C_{1\text{-}10}$alkyl", by itself or as part of another substituent, represents a group of Formula —$R^e$—OH, wherein $R^e$ is $C_{1\text{-}10}$alkyl.

The term "alkoxy" or "alkyloxy" as used herein refers to a group having the formula —$OR^d$ wherein $R^d$ is alkyl. For instance, the term "$C_{1\text{-}20}$alkoxy" or "$C_{1\text{-}20}$alkyloxy" refers to a group having the formula —$OR^d$ wherein $R^d$ is $C_{1\text{-}20}$alkyl For instance, the "$C_{1\text{-}6}$alkoxy" or "$C_{1\text{-}6}$alkyloxy" refers to a group having the formula —$OR^d$ wherein $R^d$ is $C_{1\text{-}6}$alkyl. Non-limiting examples of suitable alkoxy include methoxy, ethoxy, propoxy, isopropoxy, butoxy, isobutoxy, sec-butoxy, tert-butoxy, pentyloxy and hexyloxy.

The terms "heterocyclyl" or "heterocyclo" as used herein by itself or as part of another substituent refer to non-aromatic, fully saturated or partially unsaturated cyclic groups (for example, 3 to 13 member monocyclic, 7 to 17 member bicyclic, or 10 to 20 member tricyclic ring systems, or containing a total of 3 to 10 ring atoms) which have at least one heteroatom in at least one carbon atom-containing ring. Each ring of the heterocyclic group containing a heteroatom may have 1, 2, 3 or 4 heteroatoms selected from nitrogen atoms, oxygen atoms and/or sulfur atoms, where the nitrogen and sulfur heteroatoms may optionally be oxidized and the nitrogen heteroatoms may optionally be quaternised. The heterocyclic group may be attached at any heteroatom or carbon atom of the ring or ring system, where valence allows. The rings of multi-ring heterocycles may be fused, bridged and/or joined through one or more spiro atoms. An optionally substituted heterocyclic refers to a heterocyclic having optionally one or more substituents (for example 1 to 4 substituents, or for example 1, 2, 3 or 4), selected from those defined above for substituted aryl.

Exemplary heterocyclic groups include piperidinyl, azetidinyl, imidazolinyl, imidazolidinyl, isoxazolinyl, oxazolidinyl, isoxazolidinyl, thiazolidinyl, isothiazolidinyl, piperidyl, succinimidyl, 3H-indolyl, isoindolinyl, chromenyl, isochromanyl, xanthenyl, 2H-pyrrolyl, 1-pyrrolinyl, 2-pyrrolinyl, 3-pyrrolinyl, pyrrolidinyl, 4H-quinolizinyl, 4aH-carbazolyl, 2-oxopiperazinyl, piperazinyl, homopiperazinyl, 2-pyrazolinyl, 3-pyrazolinyl, pyranyl, dihydro-2H-pyranyl, 4H-pyranyl, 3,4-dihydro-2H-pyranyl, phthalazinyl, oxetanyl, thietanyl, 3-dioxolanyl, 1,4-dioxanyl, 2,5-dioximidazolidinyl, 2,2,4-piperidonyl, 2-oxopiperidinyl, 2-oxopyrrolodinyl, 2-oxoazepinyl, indolinyl, tetrahydropyranyl, tetrahydrofuranyl, tetrehydrothienyl, tetrahydroquinolinyl, tetrahydroisoquinolinyl, thiomorpholinyl, thiomorpholinyl sulfoxide, thiomorpholinyl sulfone, 1,3-dioxolanyl, 1,4-oxathianyl, 1,4-dithianyl, 1,3,5-trioxanyl, 6H-1,2,5-thiadiazinyl, 2H-1,5,2-dithiazinyl, 2H-oxocinyl, 1H-pyrrolizinyl, tetrahydro-1,1-dioxothienyl, N-formylpiperazinyl, and morpholinyl.

The term "oxo" as used herein refers to the group =O.

The term "halo" as used herein refers to a halogen group, for example, fluorine (F), chlorine (Cl), bromine (Br), or iodine (I).

The term "alkylcarbonyloxy" by itself or as part of another substituent refers to a —O—C(=O) $R^e$ wherein $R^e$ is as defined above for alkyl.

The term "alkenylcarbonyloxy" by itself or as part of another substituent refers to a —O—C(=O)$R^f$ wherein $R^f$ is as defined above for alkenyl.

The term "alkoxycarbonyl" by itself or as part of another substituent refers to a carboxy group linked to an alkyl i.e. to form —C(=O)$OR^e$, wherein $R^e$ is as defined above for alkyl.

The term "hydroxylcarbonyl" by itself or as part of another substituent refers to a hydroxyl group linked to a carbonyl group i.e. to form HO—(C=O)—.

The term "aryloxy" by itself or as part of another substituent refers to a group having the formula —$OR^a$ wherein $R^a$ is aryl as defined herein. For instance, $C_{6\text{-}30}$aryloxy refers to a group having the formula —$OR^a$ wherein $R^a$ is $C_{6\text{-}30}$aryl as defined herein. For instance, $C_{6\text{-}12}$aryloxy refers to a group having the formula —OR$^a$ wherein R$^a$ is C$_{6-12}$aryl as defined herein. Non-limiting examples of suitable C$_{6-12}$aryl include phenoxy, 2-naphthoxy and 1-naphthoxy.

In an embodiment, the compound has formula (I) and R$^1$ is a group selected from C$_1$-C$_{15}$alkyl; C$_{3-8}$cycloalkyl; C$_2$-C$_{15}$alkenyl; C$_2$-C$_{15}$alkynyl; C$_2$-C$_8$alkenylcarbonyloxyC$_1$-C$_8$alkyl; heterocycylC$_1$-C$_4$alkyl; hydroxylcarbonylC$_1$-C$_{50}$alkyl; C$_6$-C$_8$arylC$_1$-C$_8$alkyloxycarbonylaminoC$_1$-C$_8$alkyl; aminoC$_1$-C$_8$alkyl; haloC$_1$-C$_8$alkylcarbonyloxyC$_1$-C$_8$alkyl; hydroxyC$_1$-C$_8$alkyl; heterocycyl; C$_6$-C$_8$arylC$_1$-C$_4$alkyl; each group being optionally substituted by one or more substituents selected from C$_1$-C$_6$alkyl, hydroxyl, oxo, or wherein said at least one carbon atom in the heterocyclyl is optionally substituted by one or more oxo group, or wherein at least one nitrogen atom in the heterocyclyl is optionally substituted by an oxyl free radical;

or the compound is a polymer selected from the group comprising polyolefin, polyester, polycarbonate, polypropylene, polyethylene, poly (L) lactic acid, poly (D) lactic acid, poly (D,L) lactic acid, polybutylene succinate, polycaprolactone, polytrimethylene carbonate, polyalkylenecarbonate, polysiloxane, polyether, polystyrene, polyisoprene, polyamine, polyamide, polyvinyl alcohol, polyurethane, polyacrylate and polyaminoacid, and containing n OH and/or NH$_2$ group, where n is an integer greater than or equal to 1.

In an embodiment, the compound has formula (I) and R$^1$ is a group selected from C$_1$-C$_{10}$alkyl; C$_{3-8}$cycloalkyl; C$_2$-C$_{10}$alkenyl; C$_2$-C$_{10}$alkynyl; C$_2$-C$_4$alkenylcarbonyloxyC$_1$-C$_6$alkyl; heterocycylC$_1$-C$_4$alkyl; hydroxylcarbonylC$_1$-C$_{25}$alkyl; C$_6$-C$_7$arylC$_1$-C$_3$alkyloxycarbonylamino C$_1$-C$_6$ alkyl; aminoC$_1$-C$_6$alkyl; haloC$_1$-C$_6$alkylcarbonyloxyC$_1$-C$_6$alkyl; hydroxyC$_1$-C$_6$alkyl; heterocycyl; C$_6$-C$_8$arylC$_1$-C$_2$alkyl; each group being optionally substituted by one or more substituents selected from C$_1$-C$_4$alkyl, hydroxyl, oxo, or wherein said at least one carbon atom in the heterocyclyl is optionally substituted by one or more oxo group, or wherein at least one nitrogen atom in the heterocycyl is optionally substituted by an oxyl free radical, or the compound is a polymer selected from the group comprising polyolefin, polyester, polycarbonate, polypropylene, polyethylene, poly (L) lactic acid, poly (D) lactic acid, poly (D,L) lactic acid, polybutylene succinate, polycaprolactone, polytrimethylene carbonate, polyalkylenecarbonate, polysiloxane, polyether, polystyrene, polyisoprene, polyamine, polyamide, polyvinyl alcohol, polyurethane, polyacrylate and polyaminoacid, and containing n OH and/or NH$_2$ group, where n is an integer greater than or equal to 1.

The process employs ring-opening oligomerisation of lactide in the presence of a transfer agent that is the compound of formula (I). Oligomerisation is performed in the presence of a catalyst, which is preferably a metal catalyst. Oligomerisation can performed using a technique of melt polymerization (bulk) or in solvent. Oligomerisation can be performed in one pot reactor.

Oligomerisation can be performed at a temperature of 70° C.-190° C. Preferably, the reaction is performed at a temperature of greater than 105° C., 106° C., 107° C., 108° C., 109° C., or 110° C. The temperature is preferably that of the reaction itself. According to an embodiment, the oligomerisation can be performed at a temperature of at least 110° C. when the catalyst has general formula III. According to an embodiment, the oligomerisation can be performed at a temperature of at least 140° C. when the catalyst has general formula M(Y$^1$, Y$^2$, . . . Y$^p$)$_q$. According to an embodiment, without solvent, oligomerisation can be performed at a temperature of 110° C.-190° C. in bulk. According to an embodiment, with solvent, oligomerisation can be performed at a temperature of 90° C.-120° C. According to an embodiment, without solvent, oligomerisation can be performed at a temperature of 140-190° C. in bulk when the catalyst has general formula M(Y$^1$, Y$^2$, . . . Y$^p$)$_q$. According to an embodiment, with solvent, oligomerisation can be performed at a temperature of 90° C.-120° C. when the catalyst has general formula M(Y$^1$, Y$^2$, . . . Y$^p$)$_q$. According to an embodiment, without solvent, oligomerisation can be performed at a temperature of 110-190° C. in bulk when the catalyst has general formula (III). According to an embodiment, with solvent, oligomerisation can be performed at a temperature of −90-120° C. when the catalyst has general formula (III).

In an embodiment, R$^1$ is a group selected from C$_1$-C$_{20}$alkyl; C$_{3-8}$cycloalkyl; C$_2$-C$_{20}$alkenyl; C$_2$-C$_{20}$alkynyl; C$_2$-C$_{10}$alkenylcarbonyloxyC$_1$-C$_{10}$alkyl; heterocycyl C$_1$-C$_6$ alkyl; hydroxyl carbonyl C$_1$-C$_{100}$ alkyl; C$_6$-C$_{10}$ aryl C$_1$-C$_6$ alkyl oxy carbonyl amino C$_1$-C$_{10}$ alkyl; amino C$_1$-C$_{10}$ alkyl; halo C$_1$-C$_{10}$alkylcarbonyloxyC$_1$-C$_{10}$alkyl; hydroxyC$_1$-C$_{10}$alkyl; heterocycyl; C$_6$-C$_{10}$arylC$_1$-C$_6$alkyl; each group being optionally substituted by one or more substituents selected from C$_1$-C$_6$alkyl, hydroxyl, oxo, or wherein said at least one carbon atom in the heterocyclyl is optionally substituted by one or more oxo group, or wherein at least one nitrogen atom in the heterocycly is optionally substituted by an oxyl free radical and the reaction is performed without solvent. The temperature of the reaction can be 140-190° C. in bulk conditions; the catalyst preferably has a general formula M(Y$^1$, Y$^2$, . . . Y$^p$)$_q$. The temperature of the reaction can be 110-190° C. in bulk conditions; the catalyst preferably has general formula (III).

In an embodiment, the compound is a polymer selected from the group comprising polyolefin, polyester, polycarbonate, polypropylene, polyethylene, poly (L) lactic acid, poly (D) lactic acid, poly (D,L) lactic acid, polybutylene succinate, polycaprolactone, polytrimethylene carbonate, polyalkylenecarbonate, polysiloxane, polyether, polystyrene, polyisoprene, polyamine, polyamide, polyvinyl alcohol, polyurethane, polyacrylate and polyaminoacid, and containing n OH and/or NH$_2$ group, where n is an integer greater than or equal to 1, and the reaction can be performed with or without solvent. The temperature of the reaction can be 90-120° C. when solvent is used; preferably the catalyst has general formula M(Y$^1$, Y$^2$, . . . Y$^p$)$_q$. The temperature of the reaction can be 90-120° C. when solvent is used; preferably the catalyst has general formula (III).

The temperature of the reaction can be at least 140° C., preferably 140-190° C. when no solvent is used; the catalyst preferably has general formula M(Y$^1$, Y$^2$, . . . Y$^p$)$_q$. The temperature of the reaction can be at least 90° C., preferably 90-120° C. when solvent is used; the catalyst preferably has general formula (III).

The mole ratio of lactide to the compound.n, may be equal to or below 70, for example, 7 to 60, for example, 7 to 40 i.e. the lactide is in excess. Compound.n refers to the number of moles of compound multiplied by the total number (n) of OH and/or NH$_2$ groups in the compound. The letter n refers to the total number of OH and/or NH$_2$ groups present in the compound. More specifically, n is the number OH groups when the compound contains OH groups but not NH$_2$ groups, or n is the number NH$_2$ groups when the compound contains NH$_2$ groups but not OH groups, or n is the number OH groups and NH$_2$ groups combined when the compound contains mix of both OH groups and NH$_2$ groups. The OH and NH$_2$ groups are part of the compound by covalent attachment.

Suitable solvents include toluene, xylene, THF, C$_4$-C$_{20}$ alkane optionally branched (heptane hexane, isobutane), ethyl acetate DMF or mixture thereof.

As a result, the instant invention can provide a simplified process (e.g. one-pot-one-step), which reduces manufacturing costs. Solvent is optional. Oligomerisation can proceed under normal pressure. Both batch and continuous processes (plug-flow) can be considered. Advantageously high conversion in short reaction time can be obtained. The compound can also be used to introduce additional functionalities into the lactic acid oligomers. The products can be well defined. Narrow polydispersity could be observed in terms of final molecular weight. Low amount of by-products were observed. It is a versatile process, giving access to broad range of products in the same production unit. The same production unit for very high molecular weight PLA can be readily used to make oligomers.

Defining the mole ratio leads to a lactic acid chain formed by reaction of 70 or less lactides; hence the upper limit of the molecular weight of the oligomer is determined by this ratio. Typically a lactic acid oligomer prepared according to the process will have a (number average molecular weight (Mn) minus the molecular weight of the compound)/n of up to 10 100 g/mol, $$\frac{Mn(\text{lactic acid oligomer}) - Mw(\text{compound})}{n} \leq 10100 \text{ g/mol,}$$

wherein Mn(lactic oligomer) is measured by size exclusion chromatography, and wherein n is number of OH and NH$_2$ groups present in the compound. Typically between 900 and 8 900 g/mol. It will be appreciated that the compound of the calculation is the substance incorporated into the lactic acid oligomer.

One factor that governs the number average molecular weight is the ratio of lactide to compound. The use of a quenching agent that stops oligomerisation may also be used to control the number average molecular weight.

Number average molecular weight may be determined using any technique, for instance, using size exclusion chromatography (SEC). Typically, elution curves are calibrated with polystyrene standards.

According to one technique, SEC is performed using a VISCOTEK GPC max apparatus, using tetrahydrofuran (THF) as solvent at 25° C., using a PLgel 5 μm MIXED-C 200×75 mm column (Aligent), at a flow rate of 1 ml/min with a sample volume of 150 μl, a refractive index detector, and analysis using Waters Empower software. Elution curves are calibrated with polystyrene standards.

Suitable the lactide to be used in the reaction can be a racemate, or an isomer such as L,L-lactide, D,D-lactide, and D,L-lactide. L,L-lactide is preferably used. The lactide may be produced by any known process. A suitable process for preparing L,L-lactide is described, for example, in WO 2004/041889 which is incorporated herein by reference.

According to the invention, R$^1$ can be C$_1$-C$_{20}$alkyl. For example R$^1$ is C$_1$-C$_{18}$alkyl, for example R$^1$ is C$_1$-C$_{14}$alkyl, for example R$^1$ is C$_1$-C$_{12}$alkyl, for example R$^1$ is C$_1$-C$_{10}$alkyl, for example, R$^1$ is C$^1$-C$^3$ alkyl or C$^5$-C$^{20}$alkyl. R$^1$ can be selected from ethyl, propyl, prop-2-yl or octyl. When R$^1$ is octyl, n is preferably 1. When R$^1$ is propyl, n is preferably 1 or 3. According to the invention, R$^1$ can be hydroxyl C$_1$-C$_3$ or hydroxyl C$_5$-C$_{10}$ alkyl, and n is 2. When R$^1$ is ethyl, n is preferably 2. X$^1$ is preferably hydroxyl.

According to the invention, R$^1$ can be C$_{3-8}$cycloalkyl, for instance, R$^1$ can be C$_{3-8}$cycloalkyl, for instance, R$^1$ can be C$_{3-6}$cycloalkyl, for instance, R$^1$ can be C$_{3-5}$cycloalkyl. R$^1$ can be selected from cyclopropyl, cyclobutyl, cyclopentyl, or cyclohexyl.

According to the invention, R$^1$ can be C$_2$-C$_{20}$ alkenyl, for instance, R$^1$ can be C$_2$-C$_{18}$ alkenyl, for instance, R$^1$ can be C$_2$-C$_{16}$ alkenyl, for instance, R$^1$ can be C$_2$-C$_{14}$ alkenyl, for instance, R$^1$ can be C$_2$-C$_{12}$ alkenyl, for instance, R$^1$ can be C$_2$-C$_{10}$ alkenyl, for instance, R$^1$ can be C$_2$-C$_8$ alkenyl, for instance, R$^1$ can be C$_2$-C$_6$ alkenyl, for instance, R$^1$ can be C$_2$-C$_4$ alkenyl. R$^1$ can be selected from ethenyl, propenyl, buten-1-yl, buten-2-yl, or another longer chain alkenyl.

According to the invention, R$^1$ can be C$_2$-C$_{10}$alkenylcarbonyloxyC$_1$-C$_{10}$alkyl. For example R$^1$ can be C$_2$-C$_6$alkenylcarbonyloxyC$_1$-C$_6$alkyl, for example R$^1$ can be C$_2$-C$_4$alkenylcarbonyloxyC$_1$-C$_4$alkyl. R$^1$ can be selected from prop-2-enecarbonyloxyethyl, prop-2-enecarbonyloxypropyl, prop-2-enecarbonyloxymethyl, ethylenecarbonyloxymethyl, ethylenecarbonyloxyethyl, ethylenecarbonyloxypropyl. n is preferably 1. X$^1$ is preferably hydroxyl. In a particular embodiment, the oligomer so formed can be used for the preparation of modified polystyrene. This is particularly applicable when R$^1$ is C$_2$-C$_{10}$alkenylcarbonyloxyC$_1$-C$_{10}$alkyl, such as prop-2-enecarbonyloxyethyl.

According to the invention, R$^1$ can be heterocyclyl, for example, R$^1$ can be heterocyclyl optionally substituted by one or more substituents selected from C$_1$-C$_6$alkyl, hydroxyl, or oxo. The heterocyclyl may be a 3, 4, 5, 6, 7, 9 or 10 member monocyclic ring system, containing 1, 2 or 3 heteroatoms each independently selected from 0 or N. According to the invention R$^1$ can be an epoxymethyl, or dioxolone-2-oxo-methyl. n is preferably 1. X$^1$ is preferably hydroxyl.

According to the invention, R$^1$ can be hydroxylcarbonyl C$_1$-C$_{100}$alkyl, for example, R$^1$ can be hydroxylcarbonylC$_1$-C$_{50}$alkyl, R$^1$ can be hydroxylcarbonylC$_1$-C$_{25}$alkyl, R$^1$ can be hydroxylcarbonylC$_1$-C$_{15}$ alkyl, R$^1$ can be hydroxylcarbonylC$_1$-C$_{10}$alkyl, R$^1$ can be hydroxylcarbonylC$_1$-C$_6$alkyl, or R$^1$ can be hydroxyl carbonylC$_1$-C$_4$alkyl. n is preferably 1. X$^1$ is preferably hydroxyl.

According to the invention, R$^1$ can be C$_6$-C$_{10}$arylC$_1$-C$_6$alkyloxycarbonylaminoC$_1$-C$_{10}$alkyl, for example, R$^1$ can be C$_6$-C$_8$arylC$_1$-C$_4$alkyloxycarbonylaminoC$_1$-C$_6$ alkyl, for example R$^1$ can be C$_6$-C$_7$arylC$_1$-C$_4$alkyloxycarbonylaminoC$_1$-C$_4$ alkyl, for example R$^1$ can be phenylmethoxycarbonylaminopropyl. n is preferably 1. X$^1$ is preferably hydroxyl.

According to one embodiment of the invention, the oligomer so formed, when R$^1$ is C$_6$-C$_{10}$arylC$_1$-C$_6$alkyloxycarbonylaminoC$_1$-C$_{10}$alkyl, can be further treated to remove the C$_6$-C$_{10}$arylC$_1$-C$_6$alkyloxycarbonyl group, thereby leaving the amino C$_1$-C$_{10}$ alkyl part of the compound attached to the oligomeric lactic acid. Treatment is preferably with a suitable base such as piperidine, optionally in the presence of a suitable solvent such as in dichloromethane.

According to the invention, $R^1$ can be haloC$_1$-C$_{10}$alkylcarbonyloxyC$_1$-C$_{10}$alkyl, For example, $R^1$ can be haloC$_1$-C$_8$alkylcarbonyloxyC$_1$-C$_{10}$alkyl, for example $R^1$ can be haloC$_1$-C$_6$alkylcarbonyloxyC$_1$-C$_{10}$alkyl, for example $R^1$ can be haloC$_1$-C$_6$alkylcarbonyloxyC$_1$-C$_{10}$alkyl, for example $R^1$ can be haloC$_1$-C$_4$alkylcarbonyloxyC$_1$-C$_{10}$alkyl, for example $R^1$ can be haloC$_1$-C$_8$alkylcarbonyloxyC$_1$-C$_8$alkyl, for example $R^1$ can be haloC$_1$-C$_8$alkylcarbonyl oxyC$_1$-C$_6$alkyl, for example $R^1$ can be haloC$_1$-C$_8$alkylcarbonyloxyC$_1$-C$_4$alkyl, for example $R^1$ can be bromideisoethylcarbonyloxyethyl. n is preferably 1. $X^1$ is preferably hydroxyl.

According to the invention, $R^1$ can be a heterocycyl, for example, $R^1$ can be a heterocycyl monocyclic 4 to 6 member ring system, having 1, 2, or 3 heteroatoms. The heteroatom may be O or N. According to the invention, $R^1$ can be 6-membered ring where the heteroatom is N. The heterocycyl can be substituted by one or more substituents each independently selected from C$_1$-C$_6$alkyl, oxyl free radical, oxo. $R^1$ can be 2,2,6,6 tetramethylpiperidinyl-1-oxyl, preferably having the formula (II): wherein the asterisk indicates the point of attachment of $X^1$. $X^1$ is preferably hydroxyl. n is preferably 1, the compound is 2,2,6,6 tetramethyl piperidinyl-1-oxyl-4-ol.

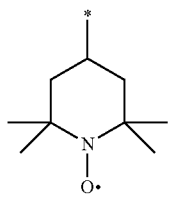

(II)

In a particular embodiment, the oligomer so formed when $R^1$ is heterocycyl can be used to prepare modified polystyrene. This is particularly applicable when $R^1$ is heterocycyl is substituted by an oxyl free radical, more particularly when is $R^1$ is 2,2,6,6 tetramethyl piperidine-1-oxyl.

According to the invention, $R^1$ can be C$_6$-C$_{10}$aryl C$_1$-C$_6$alkyl, for example, $R^1$ can be C$_6$-C$_8$arylC$_1$-C$_4$alkyl, for example, $R^1$ can be C$_6$-C$_8$arylC$_1$-C$_2$alkyl for example, $R^1$ can be benzyl. $X^1$ is preferably amine (e.g. NH$_2$). n is preferably 1.

According to the invention, the compound can be a polymer, for example, the compound can be a polyolefin, the compound can be a polyester, the compound can be a polycarbonate, the compound can be polypropylene, the compound can be polyethylene, the compound can be poly (L) lactic acid, the compound can be poly (D) lactic acid, the compound can be poly (D,L) lactic acid, the compound can be polybutylene succinate, the compound can be polycaprolactone, the compound can be polytrimethylene carbonate, the compound can be polyalkylenecarbonate, the compound can be polysiloxane, the compound can be polyether, the compound can be polystyrene, the compound can be polyisoprene, the compound can be polyamine, the compound can be polyamide, the compound can be polyvinyl alcohol, the compound can be polyurethane, the compound can be polyacrylate or the compound can be polyaminoacid; in each case the polymer contains n OH and/or NH$_2$ group(s), where n is an integer greater than or equal to 1.

When the polymer contains n OH and/or NH$_2$ group(s), where n is an integer greater than or equal to 1, it means that at least one OH and/or at least one NH$_2$ group(s) may be present in the native polymer, or that the native polymer is modified with an hydroxyl (OH) or amine (e.g. NH$_2$) group or both, for instance, by end-capping at one or both ends. It will be appreciated that n will be an integer n is an integer greater than or equal to 2 when the polymer contains at least one OH and at least one NH$_2$ group. In an example, native polyvinyl alcohol polymer or native polyacrylate polymer contains OH groups; these polymers may optionally be end capped with OH or NH$_2$. According to a particular instance, the compound may be polypropylene end-capped with an hydroxyl. The hydroxyl- or amine-capped polymer may be formed from a polymer end-capped with a vinyl group. For example, the compound may be formed from polypropylene end-capped with a vinyl group.

When more than one compound is employed, it is meant that the compounds are different. One or more compounds includes mixtures of different polymers (i.e. polymer blends). One or more compounds includes mixtures of different compounds having formula (I). One or more compounds includes mixtures of different compounds having formula (I), or mixtures of different polymers (i.e. polymer blends). According to one aspect, one or more compounds refers to a mixture of one or more compounds having formula (I) and one or more polymers (i.e. polymer blends). There may be 2, 3, 4, 5, 6, 7, 8, 9, or 10 or more different compounds employed in the method.

When more than one compound is present in the method and each compound has a different number n, for instance when the method is performed using a blend of different polymers, the reactions conditions are set such that the mole ratio of lactide to (compound.n) is equal to or below 70 for each compound. This allows each OH or NH$_2$ group of each compound to be present where lactide is in mole excess of each group by a factor of 70 or less. Eq. 1 sets out the mole ratio lactide:(compound.n) for $m_{LA}$ moles of lactide, $m_{Cmp1}$ moles of compound 1, in which a molecule of compound 1 contains $n_{Cmp1}$ number of OH and/or NH$_2$ groups.

$$\frac{m_{LA}}{n_{Cmp1} m_{Cmp1}} \leq 70 \qquad [\text{Eq. 1}]$$

Where there is a blend of different compounds (e.g. a polymer blend), Eq. 2 sets out the mole ratio lactide:(compound.n), for $m_{LA}$ moles of lactide and a blend of different compounds (Cmp1 to Cmp 5) containing $m_{Cmp1}$ moles of compound 1, in which a molecule of compound 1 contains $n_{Cmp1}$ number of OH and/or NH$_2$ groups, $m_{Cmp2}$ moles of compound 2, in which a molecule of compound 2 contains $n_{Cmp2}$ number of OH and/or NH$_2$ groups ... $m_{Cmp5}$ moles of compound 5, in which a molecule of compound 5 contains $n_{Cmp5}$ number of OH and/or NH$_2$ groups.

$$\frac{m_{LA}}{[n_{Cmp1} m_{Cmp1}] + [n_{Cmp2} m_{Cmp2}] + \ldots + [n_{Cmp5} m_{Cmp5}]} \leq 70 \qquad [\text{Eq. 2}]$$

The value of n is at least one, for example, a value in the range 1-10, 1-20, 1-30 or 1 to 500. Preferably n is 1, 2, 3, 4, 5, 6, 7, 8, or 10. When n is greater than 1 for a compound, the formation of new architectures is possible via the oligomerisation of the present process. When n=2, propeller (2-bladed) copolymers are formed having a non-lactic acid core, and oligomeric lactic acid blades. When n=3, star (3-bladed) copolymers are formed having a non-lactic acid core, and oligomeric lactic acid blades. Accordingly, the oligomer branches with a well defined length and end groups originating from the compound. This is particular suitable when the compound is a polymer selected from the group comprising polypropylene, polyethylene, poly (L) lactic acid, poly (D) lactic acid, poly (D,L) lactic acid, polysiloxane, polybutylene succinate, polytrimethylene carbonate, polycaprolactone, polyester, polyether, polyolefin, polystyrene, polyisoprene, polycarbonate, polyalkylenecarbonate, polyamine, polyamide, polyvinyl alcohol, polyurethane, polyacrylate and polyaminoacid, and containing n OH and/or $NH_2$ group(s), where n is an integer greater than or equal to 1.

The terminal groups (hydroxyl or amine) of each lactic acid oligomeric chain resulting from the process of the invention are available for further reactions. In other words, telechelic oligomers are formed by the process of the invention, in particular when n>1 (e.g. n=2); these can act as macroinitiators for the further preparation of multiblock copolymers, having a non-lactic acid core. This is particularly suitable when the compound is a polymer. The polymer preferably contains hydroxyl, or $X^1$ is preferably hydroxyl. Accordingly, a further embodiment of the invention is a use of an oligomer prepared according to the present method for the further preparation of multiblock copolymers Other compounds that give some specific microstructure in ROP of lactide could be considered such as branching agents and the like.

The catalytic system used for producing the lactic oligomers may be any suitable catalytic system. Suitable catalysts according to the invention are organometallic catalysts. Examples of organometallic catalysts follow. Suitable catalysts according to the invention can be catalyst of general formula $M(Y^1, Y^2, \ldots Y^p)_q$, in which M is a metal selected from the group comprising the elements of columns 3 to 12 of the periodic table of the elements, as well as the elements Al, Ga, In, Tl, Ge, Sn, Pb, Sb, Ca, Mg and Bi; whereas $Y^1, Y^2, \ldots Y^p$ are each substituents selected from the group comprising $C_{1-20}$alkyl, $C_{6-30}$aryl, $C_{1-20}$alkoxy, $C_{6-30}$aryloxy, and other oxide, carboxylate, and halide groups as well as elements of group 15 and/or 16 of the periodic table; p and q are integers between 1 and 6. As examples of suitable catalysts, we may notably mention the catalysts of Sn, Ti, Zr, Zn, and Bi;

preferably an alkoxide or a carboxylate and more preferably $Sn(Oct)_2$, $Ti(OiPr)_4$, Ti(2-ethylhexanoate)$_4$, Ti(2-ethylhexyloxide)$_4$, $Zr(OiPr)_4$, Bi(neodecanoate)$_3$ or Zn(lactate)$_2$.

Other suitable catalysts can be catalyst of general formula (III):

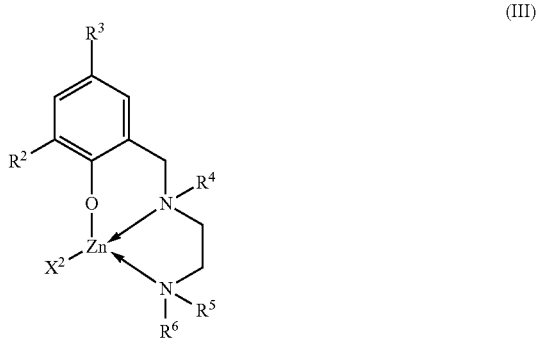

(III)

wherein
$R^2$ and $R^3$ are each independently $C_{1-10}$alkyl,
$R^4$, $R^5$ and $R^6$ are each independently $C_{1-10}$alkyl, or
$R^4$ and $R^5$ are covalently bound to each other and are each a methylene and
$R^6$ is $C_{1-10}$alkyl,
$X^2$ is selected from $C_{1-10}$alkyl, $-OR^7$, or $-N(SiR^8_3)_2$, $R^7$ is $C_{1-10}$alkyl, and $R^8$ is $C_{1-6}$alkyl.

$R^2$ and $R^3$ are each independently $C_{1-10}$alkyl; preferably, $R^2$ and $R^3$ are each independently $C_{1-6}$alkyl; preferably, $R^2$ and $R^3$ are each independently $C_{1-4}$alkyl; for example, $R^2$ and $R^3$ can be each independently selected from the group consisting of methyl, ethyl, n-propyl, i-propyl, 2-methyl-ethyl, n-butyl, i-butyl and t-butyl; preferably, $R^2$ and $R^3$ can be each independently selected from the group consisting of methyl, ethyl, i-propyl and t-butyl; for example $R^2$ and $R^3$ can be each independently selected from i-propyl or t-butyl; preferably, $R^2$ and $R^3$ are t-butyl, $R^4$, $R^5$ and $R^6$ are each independently $C_{1-10}$alkyl, preferably, $R^4$, $R^5$ and $R^6$ are each independently $C_{1-6}$alkyl, preferably $R^4$, $R^5$ and $R^6$ are each independently $C_{1-4}$alkyl, for example, $R^4$, $R^5$ and $R^6$ can be each independently selected from the group consisting of methyl, ethyl, n-propyl, i-propyl, 2-methyl-ethyl, n-butyl, i-butyl and t-butyl; for example, $R^4$, $R^5$ and $R^6$ can be each independently selected from the group consisting of methyl, ethyl, i-propyl and t-butyl; for example, $R^4$, $R^5$ and $R^6$ are each independently selected from methyl or ethyl; preferably, $R^4$, $R^5$ and $R^6$ are each independently methyl, or $R^4$ and $R^5$ are covalently bound to each other and are each a methylene and $R^6$ is $C_{1-10}$alkyl; preferably $R^6$ is $C_{1-6}$alkyl; preferably, $R^6$ is $C_{1-4}$alkyl; for example $R^6$ can be selected from the group consisting of methyl, ethyl, n-propyl, i-propyl, 2-methyl-ethyl, n-butyl, i-butyl and t-butyl; for example $R^6$ can be selected from the group consisting of methyl, ethyl, i-propyl and t-butyl; for example $R^6$ can be selected from methyl or ethyl; for example $R^6$ can be methyl;

$X^2$ is selected from $C_{1-10}$alkyl, $-OR^7$, or $-N(SiR^8_3)_2$, $R^7$ is $C_{1-10}$alkyl, and $R^8$ is $C_{1-6}$alkyl; preferably, $X^2$ is selected from $C_{1-6}$alkyl, $-OR^7$, or $-N(SiR^8_3)_2$, $R^7$ is $C_{1-6}$alkyl, and $R^8$ is $C_{1-6}$alkyl; preferably, $X^2$ is selected from $C_{1-4}$alkyl, $-OR^7$, or $-N(SiR^8_3)_2$, $R^7$ is $C_{1-4}$alkyl, and $R^8$ is $C_{1-4}$alkyl; for example $X^2$ can be selected from the group consisting of methyl, ethyl, n-propyl, i-propyl, 2-methyl-ethyl, n-butyl, i-butyl and t-butyl, or $-OR^7$, or $-N(SiR^8_3)_2$, $R^7$ can be selected from the group consisting of methyl, ethyl, n-propyl, i-propyl, 2-methyl-ethyl, n-butyl, i-butyl and t-butyl, and $R^8$ can be selected from the group consisting of methyl, ethyl, n-propyl, i-propyl, 2-methyl-ethyl, n-butyl, i-butyl and t-butyl; preferably, $X^2$ can be selected from the group consisting of methyl, ethyl, i-propyl and n-butyl, or $-OR^7$, $R^7$ can be selected from the group consisting of methyl, ethyl, i-propyl and t-butyl; preferably, $X^2$ can be selected from $-OR^7$, $R^7$ can be selected from the group consisting of methyl, ethyl, i-propyl and t-butyl; preferably, $X^2$ can be $-OR^7$, and $R^7$ is ethyl.

In an embodiment, $R^2$ and $R^3$ are each independently $C_{1-6}$alkyl. Preferably, $R^2$ and $R^3$ can be each independently selected from the group consisting of methyl, ethyl, i-propyl and t-butyl; for example $R^2$ and $R^3$ can be each independently selected from i-propyl or t-butyl; preferably, $R^2$ and $R^3$ are t-butyl.

In an embodiment, $R^4$, $R^5$ and $R^6$ are each independently $C_{1-6}$alkyl. For example, $R^4$, $R^5$ and $R^6$ can be each independently selected from the group consisting of methyl, ethyl, i-propyl and t-butyl; preferably, $R^4$, $R^5$ and $R^6$ can be each independently selected from methyl or ethyl; more preferably, $R^4$, $R^5$ and $R^6$ can be methyl.

For example, the process can be performed with a catalyst of Formula (III) wherein, $R^2$ and $R^3$ are each independently $C_{1-6}$alkyl; $R^4$, $R^5$ and $R^6$ are each independently $C_{1-6}$alkyl; and $X^2$ is selected from $C_{1-6}$alkyl, —$OR^7$, or —$N(SiR^8_3)_2$, $R^7$ is $C_{1-6}$alkyl, and $R^8$ is $C_{1-6}$alkyl.

For example, the process can be performed with a catalyst of Formula (III) wherein, $R^2$ and $R^3$ are each independently $C_{1-6}$alkyl; $R^4$ and $R^5$ are covalently bound to each other and are each a methylene and $R^6$ is $C_{1-6}$alkyl; and $X^2$ is selected from $C_{1-6}$alkyl, —$OR^7$, or —$N(SiR^8_3)_2$, $R^7$ is $C_{1-6}$alkyl, and $R^8$ is $C_{1-6}$alkyl.

For example, the oligomerisation of lactide into lactic acid oligomers can be performed with a catalyst of Formula (III) wherein, $R^2$ and $R^3$ are each independently $C_{1-4}$alkyl; $R^4$, $R^5$ and $R^6$ are each independently $C_{1-4}$alkyl, $X^2$ is selected from $C_{1-4}$alkyl, —$OR^7$, or —$N(SiR^8_3)_2$, $R^7$ is $C_{1-4}$alkyl, and $R^8$ is $C_{1-4}$alkyl.

For example, the oligomerisation of lactide into lactic acid oligomers can be performed with a catalyst of Formula (III) wherein, $R^2$ and $R^3$ are each independently $C_{1-4}$alkyl; $R^4$ and $R^5$ are covalently bound to each other and are each a methylene and $R^6$ is $C_{1-14}$alkyl; and $X^2$ is selected from $C_{1-4}$alkyl, —$OR^7$, or —$N(SiR^8_3)_2$, $R^7$ is $C_{1-4}$alkyl, and $R^8$ is $C_{1-4}$alkyl.

In a preferred embodiment, $R^2$ and $R^3$ are each independently $C_{1-4}$alkyl, preferably t-butyl or isopropyl; $R^4$, $R^5$ and $R^6$ are each independently $C_{1-2}$alkyl, $X^2$ is —$OR^7$, and $R^7$ is $C_{1-2}$alkyl.

In a preferred embodiment, $R^2$ and $R^3$ are each independently $C_{1-4}$alkyl, preferably t-butyl or isopropyl; $R^4$ and $R^5$ are covalently bound to each other and are each a methylene and $R^6$ is $C_{1-2}$alkyl; $X^2$ is —$OR^7$, $R^7$ is $C_{1-2}$alkyl.

In an embodiment, the catalyst is Formula (IIIa), (IIIb), (IIIc) or (IIId),

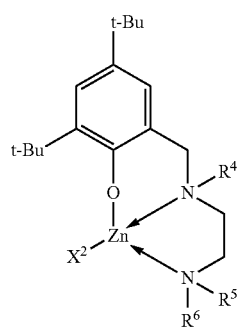

(IIIa)

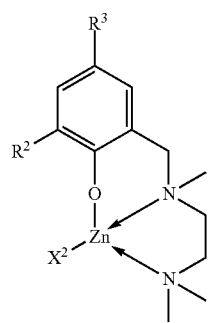

(IIIb)

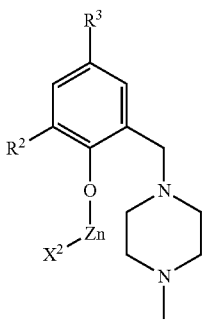

(IIIc)

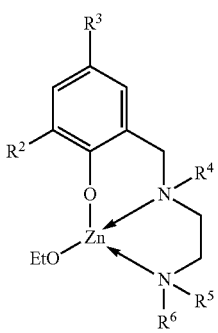

(IIId)

wherein $R^2$, $R^3$, $R^4$, $R^5$, $R^6$ and $X^2$ have the same meaning as that defined above.

In an embodiment, said catalyst of Formula (III) is (2,4-di-tert-butyl-6-(((2-(dimethylamino)ethyl)(methyl)amino)methyl)phenoxy)(ethoxy)zinc, also referred to as "DDTBP-Zn (OEt)" represented by Formula (IV).

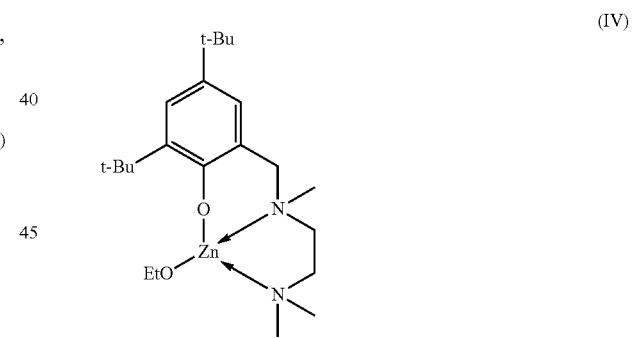

(IV)

(2,4-di-tert-butyl-6-(((2-(dimethylamino)ethyl)(methyl)amino)methyl)phenoxy)(ethoxy)zinc can be prepared as described in Williams et al. (J. Am. Chem. Soc., 2003, 125, 11350-59) hereby incorporated by reference.

The polymerization of lactide is performed in the presence of catalyst. The catalyst may be used in any amount where the lactide is in excess to catalyst. For instance, the mole ratio of lactide to catalyst may be equal to or below 200 000, 100 000, 80 000, 60 000, 40 000, 20 000, 10 000, 5 000, 3000, between 200 and 3 000, between 200 and 2800, or between 200 and 2 500.

Typically, the process of the invention is performed in a closed reaction vessel under an inert gas (e.g. nitrogen, helium) atmosphere. Preferably it is performed under melt conditions, in the absence of additional solvent. Preferably, the process is performed by contacting the lactide with the catalyst and compound in a reactor preferably equipped with an agitator for high viscosity or extrusion in a extruder (or horizontal reactor) in single, double or multiple screws in an inert atmosphere in the presence of argon or nitrogen. However, it can also take place under ambient. The temperature is regulated, for example, by immersion of the vessel or reactor in an oil bath. The reaction may be terminated.

The oligomerisation reaction may optionally be stopped using any known termination technique. Typically, it is quenched using an acid chloride. The acid chloride preferably has the formula Cl—CO—$R^9$, where $R^9$ is selected from the group consisting of: alkynyl, aminoalkyl, alkyl, $R^1$. Most preferably, $R^9$ is pent-1-ylnyl or aminoethyl. Alternatively, the oligomerisation reaction may be quenched by opening the reaction vessel, whereby atmospheric oxygen deactivates the catalyst.

The invention also relates to an oligomer prepared according to the method of the invention. The product may have a (number average molecular weight (Mn) minus the molecular weight of the compound)/n equal to or less than 10 100 g/mol, typically 900 to 8 900 g/mol. It will be appreciated that the compound is the compound incorporated into the lactic acid oligomer. When there is a mixture of compounds (e.g. polymer blend) a blend of oligomers results. For each compound of the polymer blend the resulting product has a (Mn minus the molecular weight of the compound)/n equal to or less than 10 100 g/mol, typically 900 to 8 900 g/mol.

EXAMPLES

1. Alcohol as Transfer Agent

Oligomeric L-lactic acids were synthesized by the ring-opening polymerization of L-Lactide with an $Sn(Oct)_2$ catalyst (Cat) in the presence of various kinds of alcohol as transfer agents that are compounds having formula (I). Three different alcohols were used in separate experiments, namely 1-Octanol, isopropanol and HEMA (2-hydroxyethyl metacrylate). The oligomeric products resulting from the various transfer agents are illustrated in Scheme 1 below.

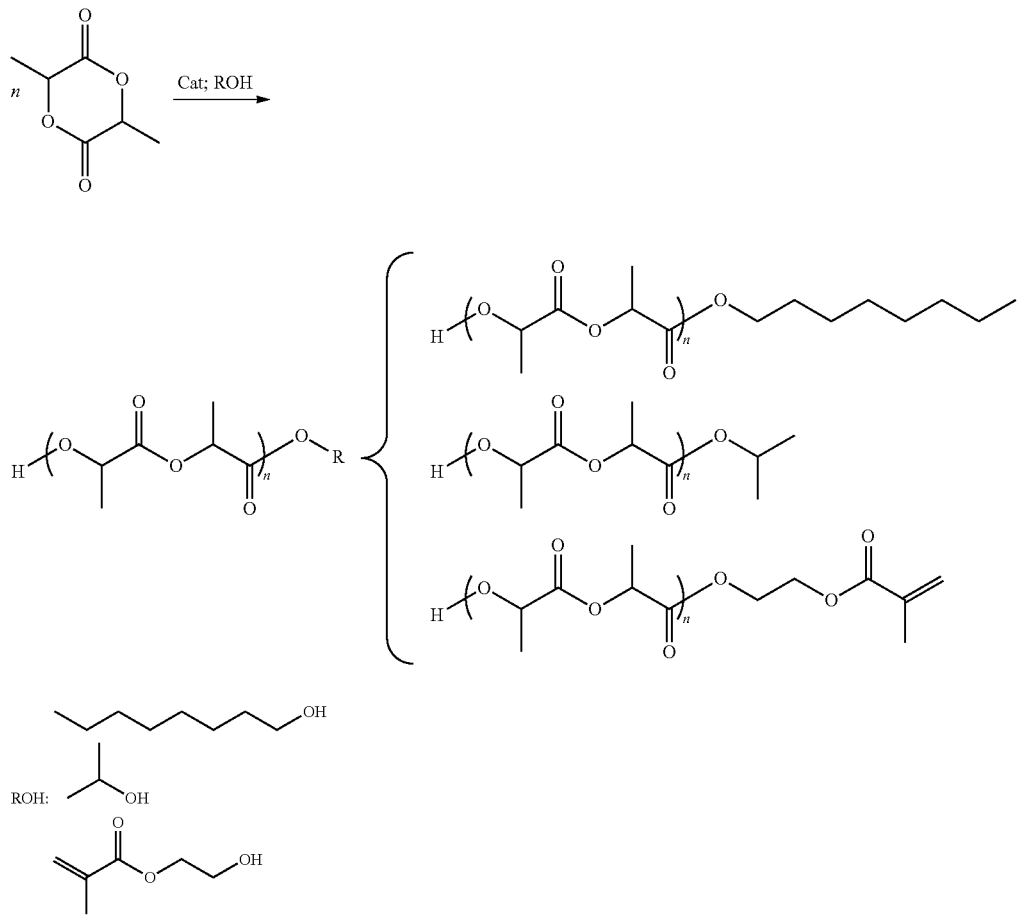

Scheme 1: Conversion of lactide to oligomeric lactic acid using three difference alcohol transfer agents.

The ring opening polymerization of L-Lactide was performed in bulk. The reactions were carried out at a temperature ranging between 150° C. and 185° C. Products were analysed by SEC. SEC was performed using a VISCOTEK GPC max instrument, with tetrahydrofuran (THF) as solvent at 25° C., using a PLgel 5 μm MIXED-C 200×75 mm column (Aligent), at a flow rate of 1 ml/min with a sample volume of 150 μl, a refractive index detector, and analysis using Waters Empower software. Elution curves were calibrated with polystyrene standards.

The results of the experiments are presented in Table 1 below.

TABLE 1

Polymerization of L-LA in bulk at 150 and 185° C. using Sn(Oct)$_2$/ROH catalyst system.

| Example | ROH | Ratio LA/Sn | Ratio LA/ROH | T (° C.) | Time (min) | Conv (%) | M$_{n\ theo}$ (g/mol) | M$_{n\ SEC}$[a] (PS) | M$_{n\ SEC}$[a] (PLA) | M$_w$/M$_n$[b] |
|---|---|---|---|---|---|---|---|---|---|---|
| 1 | Octanol | 2 186 | 36.4 | 150 | 30 | 93.5 | 5 035 | 9 971 | 5 783 | 1.26 |
| 2 | Octanol | 2 154 | 35.9 | 185 | 30 | 95.1 | 5 046 | 10 276 | 5 960 | 1.68 |
| 3 | Octanol | 784 | 7.8 | 150 | 30 | 82.2 | 1 058 | 2 530 | 1 465 | 1.21 |
| 4 | Octanol | 773 | 7.7 | 185 | 30 | 92.3 | 1 157 | 4 208 | 2 332 | 1.45 |
| 5 | Octanol | 246 | 4.1 | 150 | 60 | 67.4 | 398 | 1 610 | 933 | 1.23 |
| 6 | Octanol | 244 | 4.06 | 185 | 30 | 71.5 | 485 | 2 110 | 1 223 | 1.23 |
| 7 | $^i$PrOH | 2 039 | 33.9 | 150 | 30 | 93.4 | 4 630 | 8 853 | 5 135 | 1.36 |
| 8 | $^i$PrOH | 713 | 7.1 | 150 | 30 | 83.4 | 916 | 2 076 | 1 204 | 1.23 |
| 9 | $^i$PrOH | 239 | 3.9 | 150 | 60 | 62.4 | 417 | 1 708 | 992 | — |
| 10 | HEMA | 1 969 | 32.8 | 150 | 30 | 96.2 | 5 042 | 8 473 | 4 914 | 1.26 |
| 11 | HEMA | 706 | 7.06 | 150 | 30 | 84.1 | 985 | 2 236 | 1 296 | 1.19 |
| 12 | HEMA | 247 | 4.1 | 185 | 30 | 69 | 540 | 1 688 | 979 | — |

[a]Number average molecular weight of the oligomers as determined by SEC in THF vs. polystyrene (PS) standards and corrected by 0.58.
[b]Molecular weight distributions calculated from SEC traces.

The end-group structure of the polylactides was analyzed by $^1$H and $^{13}$C NMR, which allowed us to calculate more precisely the molecular weights of the resulting polymers. Moreover, the GPC is a good analysis to determine the PLLA molecular weights too. Characterization of the PLA oligomers by $^1$H and $^{13}$C NMR analysis in CDCl$_3$ revealed, besides the main polymer chain typical resonances, clearly the presence of both a hydroxymethyl and an alkoxy ester chain-end.

2. Amine as Transfer Agent

Oligomeric L-lactic acids were synthesized by the ring-opening polymerization of L-Lactide with an Sn(Oct)$_2$ catalyst in the presence of an amine transfer agent, benzyl amine. The reaction scheme is illustrated in Scheme 2 below.

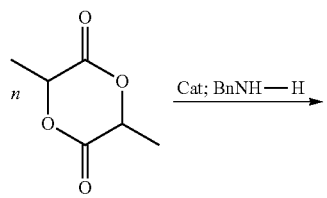

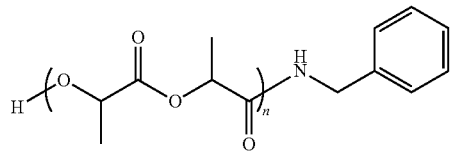

Scheme 2: Conversion of lactide to oligomeric lactic acid using an amine transfer agent.

The ring opening polymerization of L-Lactide was performed in bulk for 30 minutes. The reactions were carried out at a temperature ranging between 150° C. and 185° C. Products were analysed by SEC. SEC was performed using a VISCOTEK GPC max instrument, with tetrahydrofuran (THF) as solvent at 25° C., using a PLgel 5 μm MIXED-C 200×75 mm column (Aligent), at a flow rate of 1 ml/min with a sample volume of 150 μl, a refractive index detector, and analysis using Waters Empower software. Elution curves were calibrated with polystyrene standards. The results of the experiments are presented in Table 2 below.

TABLE 2

Oligomerisation of L-lactide in bulk at 150° C. and 185° C. using Sn(Oct)$_2$ catalyst system and BnNH$_2$ transfer agent.

| Example | RNH$_2$ | LA/Sn | LA/RNH$_2$ | T (° C.) | Time (min) | Conv (%) | M$_{n\ theo}$ (g/mol) | M$_{n\ SEC}$[a] (PS) | M$_{n\ SEC}$[a] (PLA) | M$_w$/M$_n$[b] |
|---|---|---|---|---|---|---|---|---|---|---|
| 13 | BnNH$_2$ | 1 879 | 31.3 | 150 | 30 | 89.9 | 4 161 | 8 337 | 4 835 | 1.17 |
| 14 | BnNH$_2$ | 2 120 | 35.3 | 185 | 30 | 92.4 | 4 808 | 10 112 | 5 865 | 1.65 |
| 15 | BnNH$_2$ | 763 | 7.63 | 150 | 30 | 84.4 | 945 | 2 135 | 1 238 | 1.18 |
| 16 | BnNH$_2$ | 781 | 7.8 | 185 | 15 | 74.5 | 980 | 2 140 | 1 240 | 1.24 |
| 17 | BnNH$_2$ | 244 | 60 | 150 | 60 | 77.3 | 581 | 2 009 | 1 165 | 1.21 |

[a]Number average molecular weight of the oligomers as determined by SEC in THF vs. polystyrene (PS) standards and corrected by 0.58.
[b]Molecular weight distributions calculated from SEC traces.

3. Diol and Triol Transfer Agents

Oligomeric L-lactic acids were synthesized by the ring-opening polymerization of L-Lactide with an $Sn(Oct)_2$ catalyst in the presence of a diol or triol transfer agents. This resulted in linear telechelic dihydroxy HO-PLLA-OH, or 3-arms star trihydroxy R-$(PLLA-OH)_3$ polymers. The transfer agents used were diol (1,3-propanediol) or a triol (glycerol). The reaction scheme is illustrated in Scheme 3 below.

$^1$H and $^{13}$C NMR analyses of the PLA oligomers showed, besides the main polymer chain typical resonances, the presence of a unique polymer chain-end identified by the characteristic signals of a hydroxyl end-group. For the HO-PLA-OH and HO-PLA-$(OH)_2$ issued from the diol and the triol, the central organic moiety was also unambiguously identified. These polymers, thanks to their hydroxyl end group, can act as macroinitiators for the preparation of multiblock copolymers.

Scheme 3: Conversion of lactide to oligomeric lactic acid using a diol or triol transfer agent.

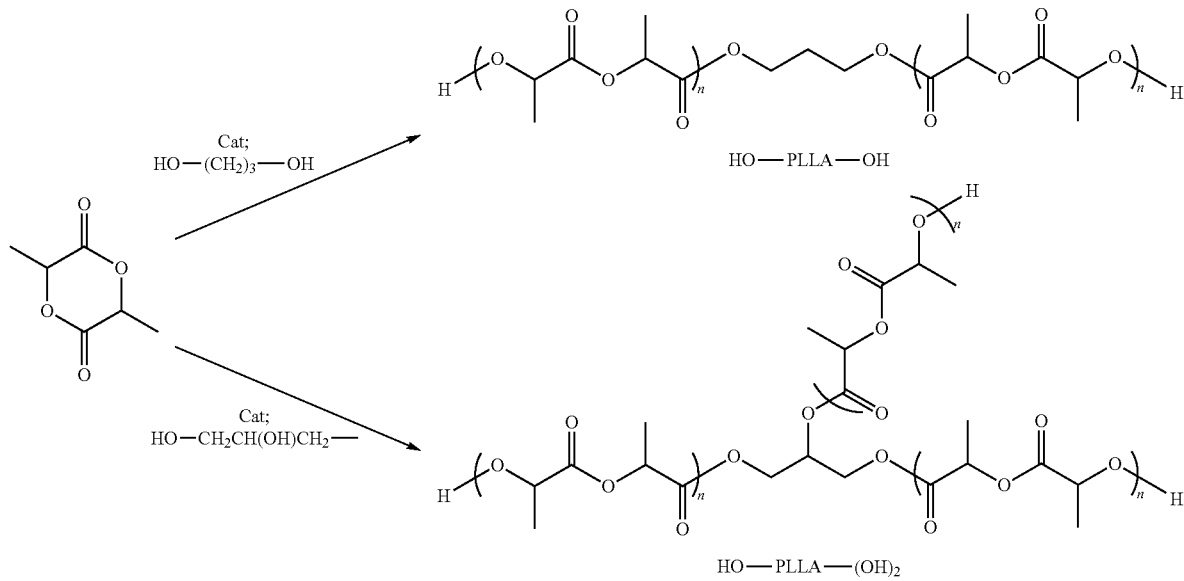

The ring opening polymerization of L-Lactide was performed in bulk for 30 minutes. The reactions were carried out at a temperature ranging between 150° C. and 185° C. Products were analysed by SEC. SEC was performed using a VISCOTEK GPC max instrument, with tetrahydrofuran (THF) as solvent at 25° C., using a PLgel 5 μm MIXED-C 200×75 mm column (Aligent), at a flow rate of 1 ml/min with a sample volume of 150 μl, a refractive index detector, and analysis using Waters Empower software. Elution curves were calibrated with polystyrene standards. The results of the experiments are presented in Table 3 below.

4. Functional Polymer as Transfer Agent

Oligomeric L-lactic acids were synthesized by the ring-opening polymerization of L-Lactide with an $Sn(Oct)_2$ catalyst in the presence of a hydroxyl-end capped macro polymer. Hydroxy-end-capped polypropylene (PP) was used as macro-initiators and transfer agents to prepare, with high efficiency, a variety diblock and triblock copolymers. The reaction scheme is illustrated in 4 below.

TABLE 3

Polymerization of L-LA in bulk at 150 and 185° C. using $Sn(Oct)_2$ catalyst and a diol (PPD) or triol (GLY) transfer agent.

| Example | $R(OH)_n$ | LA/Sn | $LA/R(OH)_n$[c] | T (° C.) | Time (min) | Conv (%) | $M_{n\ theo}$ (g/mol) | $M_{n\ SEC}$[a] (PS) | $M_{n\ SEC}$[a] (PLA) | $M_w/M_n$[b] |
|---|---|---|---|---|---|---|---|---|---|---|
| 18 | PPD | 1 945 | 32.4 | 150 | 30 | 93.3 | 4 431 | 7 625 | 4 422 | 1.18 |
| 19 | PPD | 751 | 7.5 | 185 | 30 | 64.1 | 877 | 2 290 | 1 328 | 1.27 |
| 20 | GLY | 2 013 | 33.6 | 150 | 30 | 89.8 | 4 430 | 8 890 | 5 156 | 1.24 |
| 21 | GLY | 697 | 6.96 | 150 | 30 | 95.8 | 1 054 | 2 540 | 1 473 | 1.17 |
| 22 | GLY | 712 | 7.12 | 185 | 30 | 92.4 | 1039 | 2765 | 1604 | 1.34 |

[a]Number average molecular weights of the oligomers as determined by SEC in THF vs. polystyrene (PS) standards and corrected by 0.58.
[b]Molecular weight distributions calculated from SEC traces.
[c]The ratio is not corrected to account for n number of OH groups.

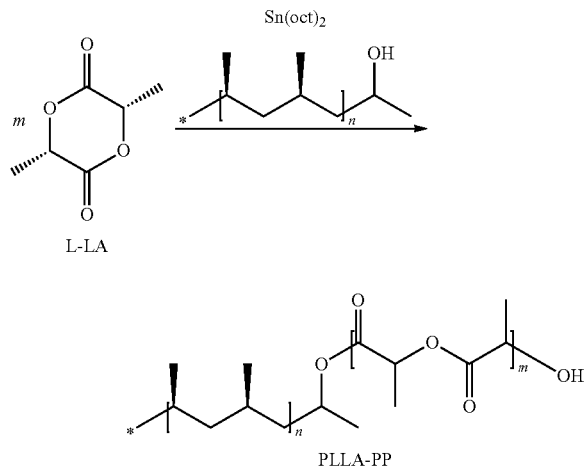

Scheme 4: Conversion of lactide to oligomeric lactic acid using hydroxy-end-capped polypropylene as transfer agent.

The ring opening polymerization of L-Lactide was performed in toluene. The reaction was carried out at a temperature of 110° C. Products were analysed by SEC. SEC was performed using a VISCOTEK GPC max instrument, with tetrahydrofuran (THF) as solvent at 25° C., using a PLgel 5 μm MIXED-C 200×75 mm column (Aligent), at a flow rate of 1 ml/min with a sample volume of 150 μl, a refractive index detector, and analysis using Waters Empower software. Elution curves were calibrated with polystyrene standards. The results of the experiments are presented in Table 4 below.

Hydroxy-end-capped polypropylene initiators (PP-OH) which are used in the examples below (Table 4) are derived from the propylene. Propylene is first polymerized with a metallocene catalyst as described in U.S. Pat. No. 6,376,418B1. The polymer is subsequently submitted to a hydroboration/oxidation reaction in conditions described by Gray et al.; Macromolecules 1998, 31, 3417-3423). Finally the vinyl terminated polymer chains are converted to —OH terminated ones.

TABLE 4

Polymerization of L-LA in solvent at 110° C. using Sn(Oct)$_2$ catalyst system and hydroxy-end-capped polypropylene (PP-OH) as transfer agent.

| Example | R(OH)$_n$ | LA/Sn | LA/R(OH)n[c] | M$_n$ R(OH)$_n$ | T (° C.) | solvent | Time (min) | Conv (%) | Mn theo | M$_n$ $_{SEC}$[a] (PLA) | M$_w$/M$_n$[b] |
|---|---|---|---|---|---|---|---|---|---|---|---|
| 23 | PP-OH | 1000 | 12.1 | 960 | 110 | toluene | 300 | 88 | 2 493 | 2 130 | — |
| 24 | PP-OH | 1000 | 26.3 | 2 200 | 110 | toluene | 300 | 81 | 5 270 | 4 490 | — |

[a]Number average molecular weights of the oligomers as determined by SEC in THF vs. polystyrene (PS) standards and corrected by 0.58.
[b]Molecular weight distributions calculated from SEC traces.
[c]The ratio is not corrected to account for n number of OH groups.

The alcohols, multi-ols or amines group incorporation was confirmed by $^1$H and $^{13}$C NMR and GPC. Using, the Sn(Oct)$_2$ precursor, varying the compound to alcohol, amine or multi-ol, revealed the versatility of this approach, allowing the preparation of accordingly end-functionalised HO-PLLAOR polymers.

PP-PLA Properties

Blends of PP and PLA are known to exhibit heterogeneities due to polymer incompatibility (polymers are not miscible with each other). Example 23 from Table 4 is blended with a metallocene based polypropylene resin (MR 2001, Melt Index=25 g/min) and a PLA homopolymer prepared by ROP (Melt Index=15-30 g/min):blend ratio=40/40/10 (wt %) PP/PLA/PP-PLA. A pure PP/PLA blend (50/50) is prepared as comparison. The blends are done at 200° C. and 100 rpm in a Haake micro-compounder.

Figure 2:
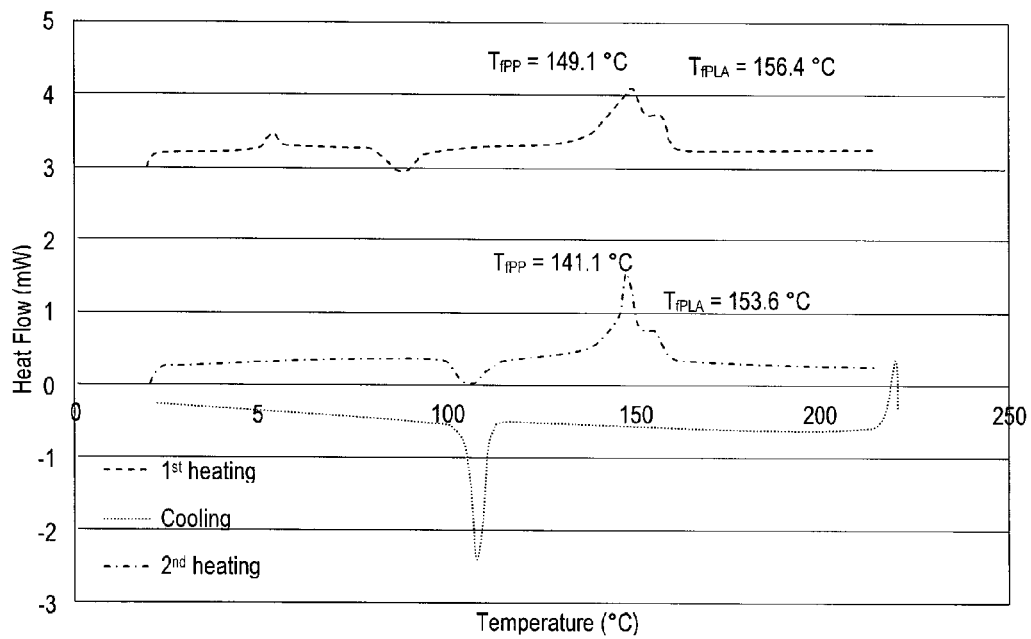
FIG. 2 is a presentation of the DSC curve PP/PLA/PP-PLA blend (40/40/10).

The thermal properties (DSC curves obtained with a heating/cooling rate of 20° C./min between 20° C. and 220° C.) of the resulting materials are shown in FIG. 1 (PP/PLA 50/50) and FIG. 2 (PP/PLA/PP-PLA 40/40/10). They show an improved compatibility for the blend containing PP-PLA with a different melting profile compared to the PP/PLA blend.

Figure 3:
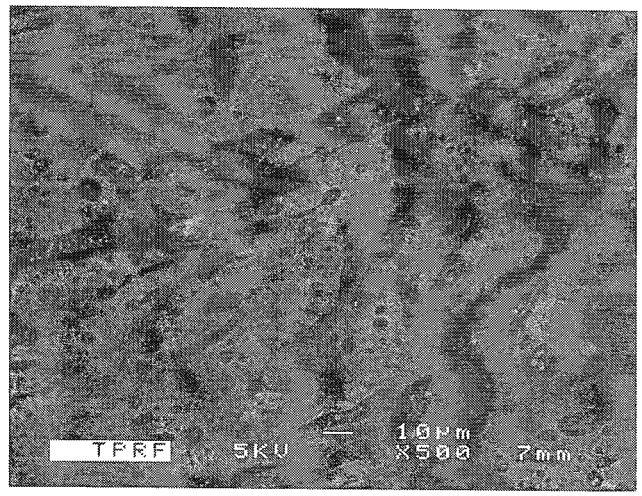
FIG. 3 is a presentation of the SEM picture of blend PP/PLA 50/50.
Figure 4:
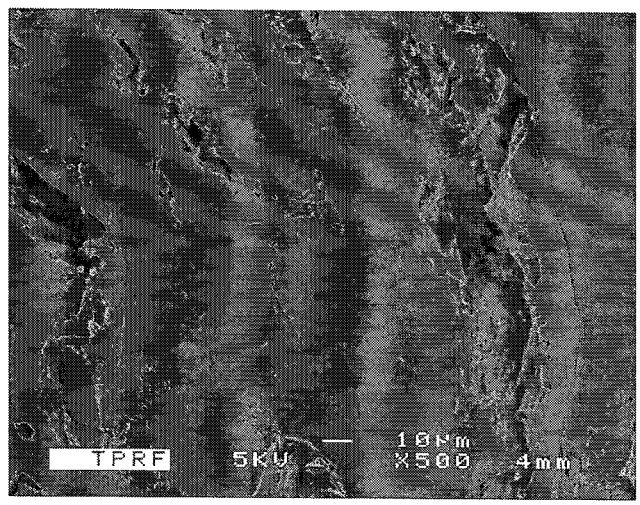
FIG. 4 is a presentation of the SEM picture of blend PP/PLA/PP-PLA 40/40/10.

After staining with RuO$_4$, the material was analyzed by Scanning Electron Microscopy. FIGS. 3 and 4 show the PP/PLA 50/50 and PP/PLA/PP-PLA 40/40/10 blends respectively.

These results show that the addition of PP-PLA to the PP/PLA mixture improves the compatibility of the 2 materials.

The invention claimed is:

1. A process for the manufacture of a block copolymer comprising:

contacting lactide monomers in the presence of a catalyst with at least one compound to form the block copolymer comprising a lactic acid chain;

wherein each compound is a polymer selected from the group consisting of polypropylene, polyethylene, polysiloxane, polybutylene succinate, polytrimethylene carbonate, polyester, polyether, polystyrene, polyisoprene, polycarbonate, polyalkylenecarbonate, polyvinyl alcohol, polyurethane, and polyacrylate;

wherein each polymer contains n number of OH and/or NH$_2$ group(s), wherein n is an integer greater than or equal to 1, wherein $$\frac{\text{Moles of Lactide}}{(\text{Moles of Compound} * n)} \leq 70$$

wherein reaction is performed at a temperature of at least 70° C.;

quenching the reaction of formed lactic acid chains consisting of 70 or less of the lactide monomers, wherein the quenching agent is an acid chloride having a formula of Cl—CO—R$^9$, wherein R$^9$ is 1-pentenyl or aminoethyl, and wherein each lactic acid chain is bonded to one of the polymers;

wherein

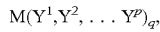
$$\frac{Mn(\text{lactic acid oligomer}) - Mw(\text{compound})}{n} \leq 10100 \text{ g/mol}$$

wherein Mn(lactic acid chain) is measured by size exclusion chromatography, and wherein n is the number of OH and $NH_2$ groups present in the compound.

2. The process according to claim 1, wherein said process is performed without solvent.

3. The process according to claim 2, wherein said process is performed at a temperature of 110° C. to 190° C.

4. The process according to claim 1, wherein the catalyst is an organometallic catalyst.

5. The process according to claim 1, wherein said catalyst has general formula:

$$M(Y^1, Y^2, \ldots Y^p)_q,$$

wherein M is a metal selected from the elements of columns 3 to 12 of the periodic table of the elements, as well as the elements Al, Ga, In, Tl, Ge, Sn, Pb, Sb, Ca, Mg and Bi;

wherein $Y^1, Y^2, \ldots Y^p$ are each substituents selected from $C_{1-20}$ alkyls, $C_{6-30}$ aryls, $C_{1-20}$ alkoxys, $C_{6-30}$ aryloxys, other oxides, carboxylates, and halide groups as well as elements of group 15 and/or 16 of the periodic table;

wherein p and q are integers between 1 and 6.

6. The process according to claim 5, wherein the reaction is performed at a temperature of at least 140° C.

7. The process according to claim 1, wherein n is at least 2.

8. The process according to claim 1, wherein said compound is a polymer that is selected from the group consisting of: polypropylene, polyethylene, polysiloxane, polybutylene succinate, polytrimethylene carbonate, polystyrene, polycarbonate, polyalkylenecarbonate, polyvinyl alcohol, and polyurethane, wherein the polymer contains n number of OH and/or $NH_2$ group(s), and wherein n is an integer greater than or equal to 1.

9. The process according to claim 1, wherein the compound is a polymer selected from the group consisting of: polypropylene, polyethylene, polysiloxane, polybutylene succinate, polytrimethylene carbonate, polycarbonate, polyalkylenecarbonate, polyvinyl alcohol, and polyurethane, wherein the polymer contains n number of OH group(s), and wherein n is an integer greater than or equal to 1.

* * * * *